United States Patent
Pet et al.

(10) Patent No.: US 12,521,030 B2
(45) Date of Patent: Jan. 13, 2026

(54) WIRELESS PROBES FOR MONITORING BLOOD FLOW IN BIOLOGICAL TISSUE

(71) Applicants: Washington University, St. Louis, MO (US); Northwestern University, Evanston, IL (US)

(72) Inventors: Mitchell Pet, St. Louis, MO (US); Matthew MacEwan, Olivette, MO (US); John Rogers, Evanston, IL (US); Changsheng Wu, Evanston, IL (US); Di Lu, Evanston, IL (US); Wubin Bai, Evanston, IL (US); Hexia Guo, Evanston, IL (US); Shuo Li, Evanston, IL (US); Hany Arafa, Evanston, IL (US)

(73) Assignees: Washington University, St. Louis, MO (US); Northwestern University, Evanston, IL (US)

( * ) Notice: Subject to any disclaimer, the term of this patent is extended or adjusted under 35 U.S.C. 154(b) by 178 days.

(21) Appl. No.: 18/249,880

(22) PCT Filed: Oct. 22, 2021

(86) PCT No.: PCT/US2021/056200
§ 371 (c)(1),
(2) Date: Apr. 20, 2023

(87) PCT Pub. No.: WO2022/087374
PCT Pub. Date: Apr. 28, 2022

(65) Prior Publication Data
US 2023/0397831 A1    Dec. 14, 2023

Related U.S. Application Data

(60) Provisional application No. 63/094,999, filed on Oct. 22, 2020.

(51) Int. Cl.
*A61B 5/00* (2006.01)
*A61B 5/026* (2006.01)
*A61B 5/1455* (2006.01)

(52) U.S. Cl.
CPC .......... *A61B 5/0261* (2013.01); *A61B 5/0075* (2013.01); *A61B 5/1455* (2013.01)

(58) Field of Classification Search
CPC ....... A61B 5/0075; A61B 5/01; A61B 5/0261; A61B 5/1455; A61B 5/14552; A61B 5/1459
See application file for complete search history.

(56) References Cited

U.S. PATENT DOCUMENTS

2016/0287165 A1* 10/2016 Abreu .................... A61B 5/441
2019/0206538 A1   7/2019 Xing et al.

FOREIGN PATENT DOCUMENTS

WO    2015054681 A1   4/2015

OTHER PUBLICATIONS

Kleshinin M. S. et al., Method of measuring blood oxygenation based on spectroscopy of diffusely scattered light, Quantum Electronics, 2017, 47, 4:355.

(Continued)

*Primary Examiner* — Mark D Remaly
(74) *Attorney, Agent, or Firm* — Armstrong Teasdale LLP

(57) ABSTRACT

A wearable probe includes a sensor module and a control module. The sensor module includes a transmission source to transmit signals into the tissue at a source position, and two detectors to detect a result of the signals, the two detectors including a first detector positioned at a first separation distance from the source position and a second detector positioned at a second separation distance from the source position. The control module includes a controller and a battery to power the controller and the sensor module.

(Continued)

The control module includes a processor, a memory including instructions, and a communications interface. The instructions cause the processor to control the sensor module to transmit signals into the tissue and detect results of the signals with the at least two detectors, receive the detected results, store the detected results in the memory, and transmit the detected results to a remote device.

18 Claims, 36 Drawing Sheets

(56) References Cited

OTHER PUBLICATIONS

Dittmar A., et al., A Non Invasive Wearable Sensor for the Measurement of Brain Temperature, International Counsel of the IEEE Engineering in Medicine and Biology Society, 2007, pp. 900-902.
International Search Report and Written Opinion issued in PCT/US2021/056200 mailed on Feb. 17, 2023; pp. 1-12.

* cited by examiner 1 heater + 2 sensor

WIRELESS PROBES FOR MONITORING BLOOD FLOW IN BIOLOGICAL TISSUE

CROSS-REFERENCE TO RELATED APPLICATIONS

This application is a US National Stage Entry of International Patent Application No. PCT/US2021/056200, filed Oct. 22, 2021, which claims priority to U.S. Provisional Patent Application Ser. No. 63/094,999, filed Oct. 22, 2020, the entire contents of which are hereby incorporated by reference in their entireties.

FIELD OF THE DISCLOSURE

The present disclosure generally relates to devices, systems, and methods for monitoring of blood flow and other parameters within biological tissues.

BACKGROUND OF THE DISCLOSURE

Microsurgical free flap reconstruction of oncologic, traumatic, and congenital defects requires microvascular anastomosis to establish perfusion of the transferred tissue. Because these anastomoses are susceptible to thrombosis in the post-operative period, flap tissue perfusion monitoring is imperative. Previous animal studies indicate that 5 days are required for reendothelialization of the vascular anastomosis. The duration of flap monitoring varies by surgeon and institution. Typically, free flaps are monitored for 2-5 days prior to hospital discharge.

Various strategies for cutaneous free flap monitoring are currently in use. Traditional intermittent methods like serial physical examination and external Doppler remain common but are limited by their inherently subjective nature and requirement for skilled bedside personnel. Additionally, intermittent assessment strategies are unable to differentiate between venous and arterial malperfusion events and are further subject to delays in the diagnosis of malperfusion, especially because clear external signs of flap malperfusion may not be detectable for several hours.

Internal Doppler systems position a wired Doppler probe directly at or adjacent to the anastomosis and provide a continuous audible signal indicative of blood flow. While the use of Doppler systems may accelerate the process of identifying a malperfused flap and improve flap salvage rate, such systems are not well suited to remote monitoring, and therefore require frequent monitoring by skilled bedside personnel. Furthermore, Doppler probes may cause direct deformation or trauma to the anastomosis during probe placement and/or removal. Doppler probes are further known to produce false-positive alarms at a relatively high rate due to probe disengagement.

Near-infrared spectroscopy (NIRS) has gained favor as a strategy for continuous monitoring of cutaneous free flaps. NIRS is non-invasive and provides objective numeric data to facilitate remote monitoring and to reduce the need for skilled personnel at bedside. For example, the T.Ox device (ViOptix Inc., Fremont, CA) is a widely utilized NIRS-based monitor that has demonstrated excellent sensitivity and specificity for the detection of flap compromise.

Although the T.Ox system has many desirable clinical characteristics, this device is accompanied by some limitations. The T.Ox system includes a cable connection between the probe and external display console that is necessary for the functionality of its infrared light-emitting lasers and for the transmission of the gathered data back to the bedside display module. Unfortunately, shifts in patient position, rearrangement of linens, or attempts at ambulation may cause modest traction on or twisting of the cable connection, resulting in disturbance or fluid incursion at the flap-probe interface. As a result, the T.Ox system also generates spurious signal changes or signal losses that necessitate immediate and frequent sensor/cable troubleshooting or replacement and undue worry for the surgeon and patient. These false alarms may also infrequently result in unnecessary emergent surgical exploration that exposes patients to additional risks and increases to cost of care.

Other objects and features will be in part apparent and in part pointed out hereinafter.

BRIEF DESCRIPTION

In one aspect, a wearable probe for monitoring blood flow in biological tissue includes a sensor module configured to be positioned proximate the tissue to be monitored and a control module electrically connected to the sensor module. The sensor module includes at least one transmission source configured to transmit signals into the tissue at a source position, and at least two detectors configured to detect a result of the signals transmitted by the at least one transmission source, the at least two detectors including a first detector positioned at a first separation distance from the source position and a second detector positioned at a second separation distance from the source position. The control module includes a controller and a battery operable to power the controller and the sensor module. The control module includes a processor, a memory including instructions executable by the processor, and a communications interface. The instructions, when executed by the processor, cause the processor to control the sensor module to transmit signals into the tissue and detect results of the signals with the at least two detectors, receive the detected results, store the detected results in the memory, and transmit the detected results to a remote device using the communications interface.

DESCRIPTION OF THE DRAWINGS

Those of skill in the art will understand that the drawings, described below, are for illustrative purposes only. The drawings are not intended to limit the scope of the present teachings in any way.

Figure 1:
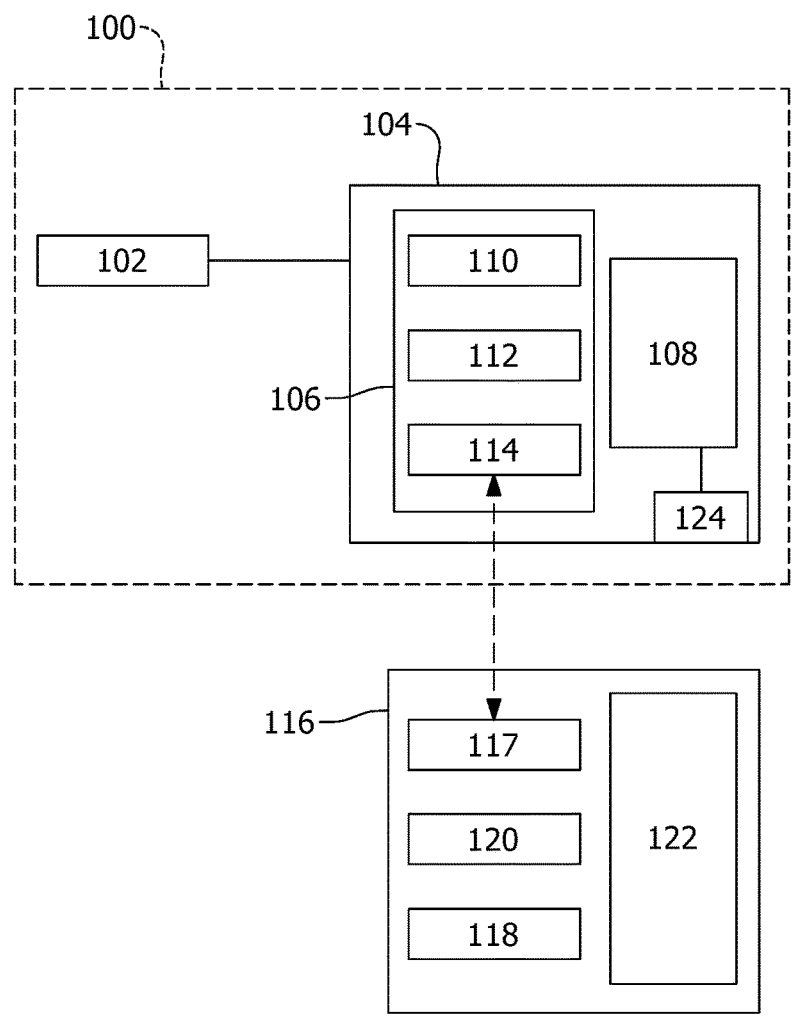
FIG. 1 is a block diagram of an example probe according to the present disclosure.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION

Aspects of this disclosure will be described below with reference to particular uses, such as for perfusion monitoring or cutaneous free flap monitoring. However, this disclosure is not limited to such described uses and may be used for any procedure benefiting from monitoring blood flow in biological tissue.

In various aspects, a self-contained wireless probe is disclosed. In some aspects, the disclosed probe is Bluetooth-enabled to provide for wireless transmission of measurements obtained by one or more sensors of the probe to a computing device for data storage, analysis, and display. In other aspects, the disclosed probe is waterproof, flexible, and provided with sufficient battery life to continuously obtain and transmit measurements for extended periods of up to about 5 days. In various aspects, the disclosed probe is configured to provide data indicative of the condition of a tissue, organ, or other biological structure of a patient to a clinical practitioner. Non-limiting examples of data that may be obtained using the disclosed probe include parameters indicative of tissue or organ perfusion such as temperature, pressure, pH, oxygen saturation, blood volume, thermal conductivity, thermal diffusivity, and lactate. In some aspects, tissue or organ perfusion may be monitored using any suitable method including, but not limited to, near-infrared spectroscopy (NIRS) methods and thermally-based methods such as thermal anisotropy flow monitoring. Other non-limiting examples of data that may be obtained using the disclosed probe include parameters related to a patient's condition such as skin hydration, glucose, lactate, pH, and blood gasses.

The self-contained wireless probes in various aspects may be used by a clinician to monitor one or more of the parameters described above to facilitate a diagnosis or treatment of a patient in need. In some aspects, the disclosed probes are used to monitor perfusion within transferred or transplanted tissues, organs, or other biological structures associated with a surgical treatment. Non-limiting examples of surgical treatments for which the disclosed wireless probes may be used for perfusion monitoring include a microsurgical free tissue transfer, transplantation of a solid organ such as a liver, kidney, lung, heart, or pancreas, revascularization of an ischemic limb, and any other suitable surgical treatment. In other aspects, the disclosed probes are used to monitor the condition of circulatory and metabolic status during diagnosis, treatment, or recovery of a critically ill patient or patients in a critical care, operative, or battlefield setting.

In some aspects, the wireless probes may be configured to attach externally to a portion of a patient's skin at any location without limitation. In other aspects, the wireless probes may be configured to be implanted within subcutaneous tissues of a patient. In other additional aspects, the wireless probes may be configured to be affixed to a transplant tissue, organ, or other biological structure to be implanted within the patient in association with a surgical transplantation procedure.

FIG. 1 is a block diagram of an example probe 100 according to the present disclosure. The probe 100 includes a sensor module 102 and a control module 104. The sensor module 102 and the control module 104 may be collocated within a housing (not shown) or may be separate, electrically connected modules. In embodiments in which the sensor module 102 and the control module 104 are separate modules, they may be permanently connected or removeable connected. Embodiments in which the sensor module 102 and the control module 104 are removably connected provide a modular system in which different sensor modules may be connected by a user to the same control module 104, thus allowing a single control module to be reused and/or used for different purposes, even if the sensor modules 102 are single use components. The sensor module 102 includes one or more sensor used for sensing blood flow in biological tissue, as will be described in more detail below. The control module includes a controller 106 for controlling operation of the probe, and a battery 108 (sometimes referred to as a power source) for powering the probe 100. The controller 106 includes a processor 110, a memory 112, and a communications module 114 (sometimes referred to as a "communications interface"). In some embodiments, the processor 110 and the memory 112 are separate components, while in other embodiments, the processor and the memory are part of a single component, such as in a microcontroller. In the example embodiment, the communications module 114 is a wireless communications module. In other embodiments, the communications module 114 may be any suitable wired or wireless communications module.

In general, the processor 110 of the control module 104 causes the sensor module 102 of the probe 100, powered by the battery 108, to collect data about a subject with which the sensor module is associated. The collected data is transmitted to the control module 104 and stored in the memory 112. Periodically (e.g., every second, every five seconds, every minute, etc.) the control module 104 transmits the collected data to a remote device 116 using the communications module 114. The control module 104 only transmits collected data that has not previously been sent to the remote device 116. The remote device 116 receives the transmitted data using a communications module 117 (sometimes referred to as a "communications interface") that uses a same communications protocol as the communications module 114. Calculations (e.g., as described below) are performed on the received data by a processor 118 of the remote device 116, the data and the results are stored in a memory 120 of the remote device, and the results are displayed on a display device 122 of the remote device. A user may then view the results on the display of the remote device 116.

In the example embodiment, the battery 108 is a rechargeable battery. The control module 104 includes a charging connector 124 coupled to the battery for receiving power to charge the battery 108. In the example embodiment, the charging connector 124 is configured for receiving a wired power connection, such as a USB connector. In other embodiments, the charging connector 124 is a wireless charging connector, thereby allowing the battery 108 to be charged using any suitable wireless charging system. In some embodiments, the battery108 is non-rechargeable battery, and the control module 104 may only be used until the battery 108 is discharged. In still other embodiments, the battery is a replaceable non-rechargeable battery.

In the example embodiments, the remote device 116 is a mobile phone or a tablet computer. In some embodiments, the remote device 116 is a laptop computer, a desktop computer, a personal digital assistant (PDA), or any other device operable to receive data, perform calculations, and display the results of the calculations on a display device.

A "processor" may be one or more central processing units, microprocessors, microcontrollers, reduced instruction set circuits (RISC), application specific integrated circuits (ASIC), logic circuits, and any other circuit or processor capable of executing the functions described herein. A "memory" may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above are examples only and are thus not intended to limit in any way the definition and/or meaning of the terms "processor" or memory.

In the example embodiment, the communications modules 114 and 117 comprise Bluetooth® adapters. In other embodiments, the communications modules may include one or more of a radio frequency (RF) transceiver, a Bluetooth® adapter, a Wi-Fi transceiver, a ZigBee® transceiver, an infrared (IR) transceiver, and/or any other device and communication protocol for wireless communication. (Bluetooth is a registered trademark of Bluetooth Special Interest Group of Kirkland, Washington; ZigBee is a registered trademark of the ZigBee Alliance of San Ramon, California.) In embodiments using wired communication modules, any suitable wired communication protocol for direct communication may be used including, without limitation, USB, RS232, I2C, SPI, analog, and proprietary I/O protocols. In some embodiments, the wired communication interface includes a wired network adapter allowing the controller to be coupled to a network, such as the Internet, a local area network (LAN), a wide area network (WAN), a mesh network, and/or any other network to communicate with remote devices and systems via the network.

The display device 122 may be a liquid crystal display (LCD), a light emitting diode (LED) display, an organic light emitting diode (OLED) display, a cathode ray tube (CRT) display, an "electronic ink" display, a projected display, or the like.

Figure 2:
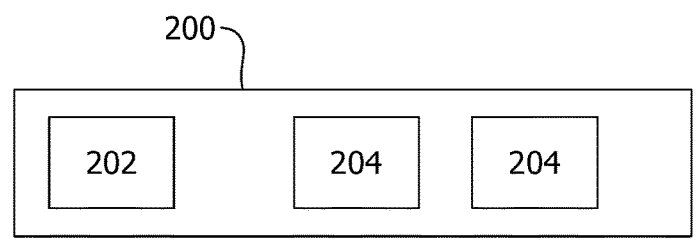
FIG. 2 is a block diagram of a first example sensor module that may be used as the sensor module shown in FIG. 1

FIG. 2 is a block diagram of a first example sensor module 200 that may be used as the sensor module 102 shown in FIG. 1. The sensor module 200 includes a transmission source 202 and two detectors 204. For embodiments in which the sensor module 200 is used for light based sensing, such as spatially resolved spectroscopy (SRS), the transmission source 202 is a light source and the two detectors 204 are two photodetectors spaced apart from the light source by different distances. In the example embodiment, the light source comprises two LED lights each emitting light at a different wavelength. Although the example embodiment includes two LED lights, any number of light sources may be used. In some embodiments, a single light operable to selectively emit light at two or more different wavelengths is used instead of two separate LEDs. Moreover, in some embodiments, two or more separate light sources may be used. Similarly, the any number of photodetectors may be used. Some embodiments include four photodetectors at four different distances from the light source) are used, which may provide more distance granularity in measurements.

In embodiments in which the sensor module 200 is used for temperature based sensing, the transmission source 202 is a heating element and the two detectors 204 are two thermal sensors spaced apart from the heating element by different distances. Although the example embodiment includes two thermal sensors, any suitable number of thermal sensors may be used. For example, in some embodiments, more than two thermal sensor (e.g., four thermal sensors at four different distances from the heating element) are used.

The sensor module 200 may be either surface or implantable sensor modules. That is, the sensor modules 200 may be configured for placement on and use on the surface of the tissue being monitored (or the skin of the patient above the tissue being monitored), or may be configured for implantation into the tissue being monitored.

I. Perfusion Sensors

In some aspects, a wireless probe for monitoring perfusion of a tissue, organ, or other biological structure is disclosed that obtains and wirelessly transmits data indicative of perfusion of tissues, organs, or other biological structures. In some aspects, perfusion is measured using a spatially resolved spectroscopy (SRS) method as described in additional detail below. In other aspects, perfusion is measured using thermal conductivity measurement methods as described in additional detail below. In other additional aspects, the perfusion probes may be provided as implantable probes configured for insertion into skin, muscle tissues, or organs. In some aspects, the perfusion sensors may be provided in the form of wired sensors that transmit measurement signals via cables.

The disclosed wireless probe overcomes at least some of the shortcomings of existing perfusion monitoring devices and methods. One existing perfusion monitoring device includes two light sources and a single light detector to monitor perfusion using differential spectroscopy (DS) methods. The DS method generates only absolute changes in hemoglobin concentrations, and tissue oxygenation index ($StO_2$) is estimated by use of nontrivial assumptions of light scattering losses in the tissue and the introduction of additional error-correcting factors. Tissue-dependent absorption and scattering coefficients used to estimate $StO_2$ are preassumed constant values from the literature that introduce potential inaccuracies into $StO_2$ estimates and hinder the deployment of this existing device on different tissue types.

In some aspects, a spatially resolved spectroscopy (SRS) probe includes two light sources and two spatially separated light detectors to implement SRS as described below. SRS derives tissue absorption coefficients directly from measured optical densities obtained in situ by the disclosed wireless probe. The incorporation of SRS methods into the design of the disclosed wireless probe eliminates potential errors in $StO_2$ measurements associated with assumed constant tissue absorption coefficients used in existing devices, and further renders the disclosed wireless probe compatible with a variety of different tissues without modification.

In other aspects, a thermal conductivity probe includes a micro-scale heating element and at least two temperature sensors located at various positions and distances from the heating element. The thermal conductivity probe derives measures of thermal conductivity based on differential temperature measurements that correlate to blood flow and tissue perfusion within a tissue.

In some aspects, the disclosed wireless probe is configured to be externally affixed to various locations on the skin of a patient, or is configured to be implanted subcutaneously or within an organ, as described in additional detail below. In these aspects, the disclosed probe is constructed using flexible materials that conform to provide intimate contact with the skin at various locations and to accommodate contour changes associated with position changes of the patient. In other aspects, the probe may be further provided with highly adhesive regions to provide robust attachment of the wireless probe to the skin of the patient. In other additional aspects, the flexible materials of the wireless probe provide the ability to fit conformally within organs or other internal regions of the patient, and the wireless probe may be further provided with additional attachment means including, but not limited to adhesive regions, barbs, fittings for medical fasteners such as sutures, staples, or screws, and any combination thereof.

In some aspects, at least portions of the disclosed wireless probe are constructed of any suitable biocompatible materials known in the art without limitation. In other aspects, at least portions of the disclosed wireless probe are constructed using biodegradable materials. In these other aspects, the biodegradable materials may be selected to degrade and resorb after completion of monitoring of measurements using the disclosed wireless probe. By way of non-limiting example, the biodegradable materials may be selected to maintain complete function of the wireless probe for a period of up to about 5 days or more, after which the biodegradable materials may be degraded, decomposed, and/or resorbed by one or more biological processes of the patient. Without being limited to any particular theory, a wireless probe that includes biodegradable materials may be implanted in a patient to monitor perfusion or other suitable parameters in a patient over an extended period without need for a follow-up procedure to remove the probe, which is degraded and resorbed by the patient internally. Non-limiting examples of biodegradable materials suitable for use in the disclosed wireless probe are described in U.S. Patent Application Publication No. 2017/0020402, the contents of which are incorporated by reference herein in their entirety.

a. Spatially Resolved Spectroscopy (SRS) Probe

Figure 3A:
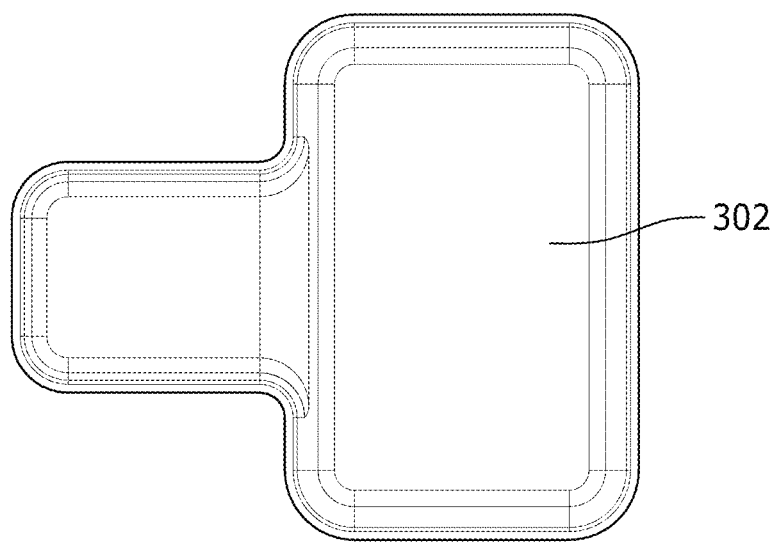
FIG. 3A is a top-view image of a wireless conformable NIRS probe in accordance with one aspect of the disclosure.
Figure 3B:
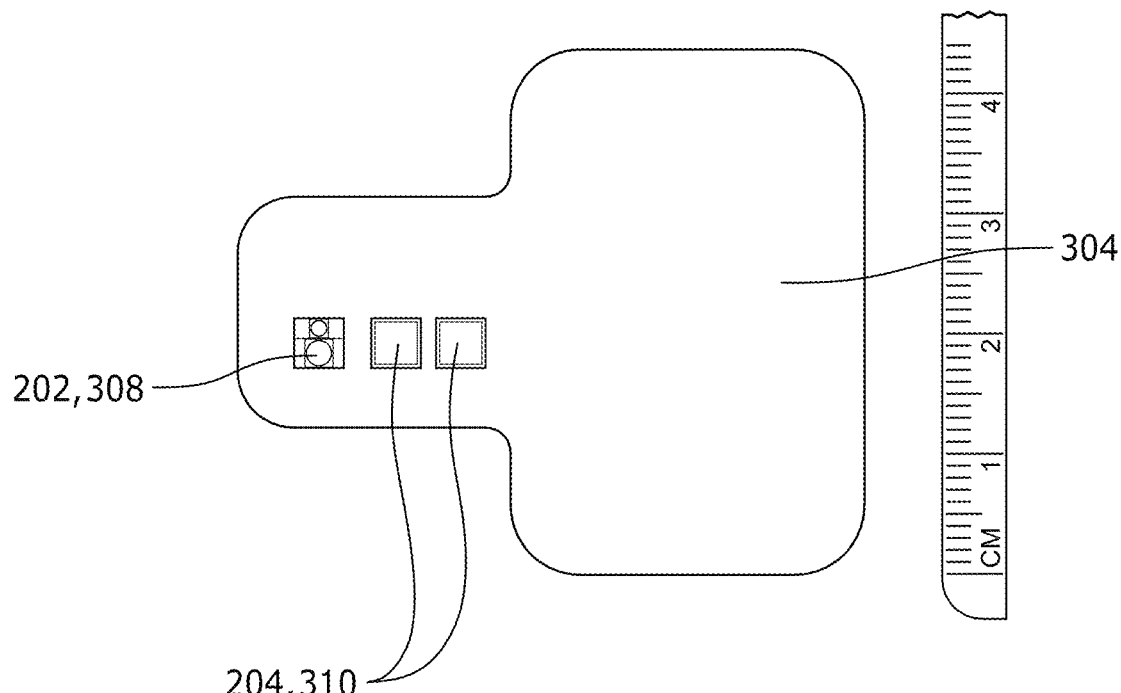
FIG. 3B is a bottom-view image of the wireless conformable NIRS probe of FIG. 3A.

In some aspects, a wireless SRS perfusion probe 300 is disclosed that is soft, flexible, and lightweight, with small size and robust adhesive interface to the skin to enable continuous and wireless measurement of tissue oxygenation at nearly any location across flaps of various types and locations of the body. FIG. 3A and FIG. 3B contain top and bottom views of the device in one aspect. The probe includes an upper casing 302 (FIG. 3A) and a lower casing 304 (FIG. 3B) constructed of a waterproof material. The upper and lower casings are constructed of any suitable material known in the art without limitation including, but not limited to, a low modulus silicone elastomer. By way of non-limiting example, the upper and lower casing may be constructed using a skin-safe silicone elastomer (Silbione RTV 4420, Elkem Silicones).

In various aspects, the lower casing is configured to adhere to the skin of a patient (not illustrated). In some aspects, at least a portion of the lower casing is provided with an adhesive layer to facilitate adhesion of the probe onto the skin of the patient. Any suitable medical-grade adhesive including, but not limited to, water-resistant medical-grade adhesives may form the adhesive layer without limitation. In some aspects, the adhesive layer is formed using a medical silicone tape. In other aspects, the adhesive layer includes a water-resistant silicone adhesive to exclude fluid from the flap-probe interface. By way of non-limiting example, the adhesive layer includes a thin medical silicone tape (2477P, 3M).

Figure 3C:
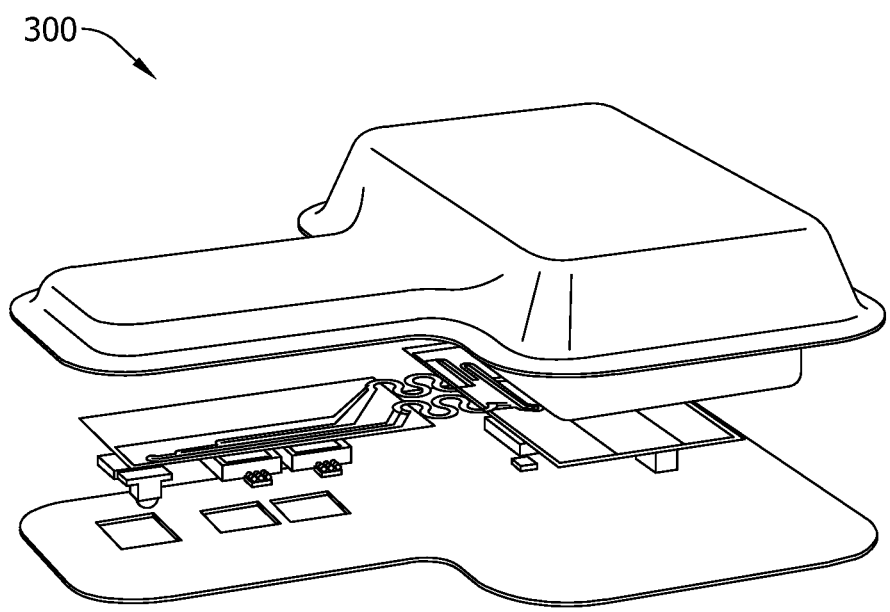
FIG. 3C is an exploded top-view image of the wireless conformable NIRS probe of FIG. 3A.
Figure 3D:
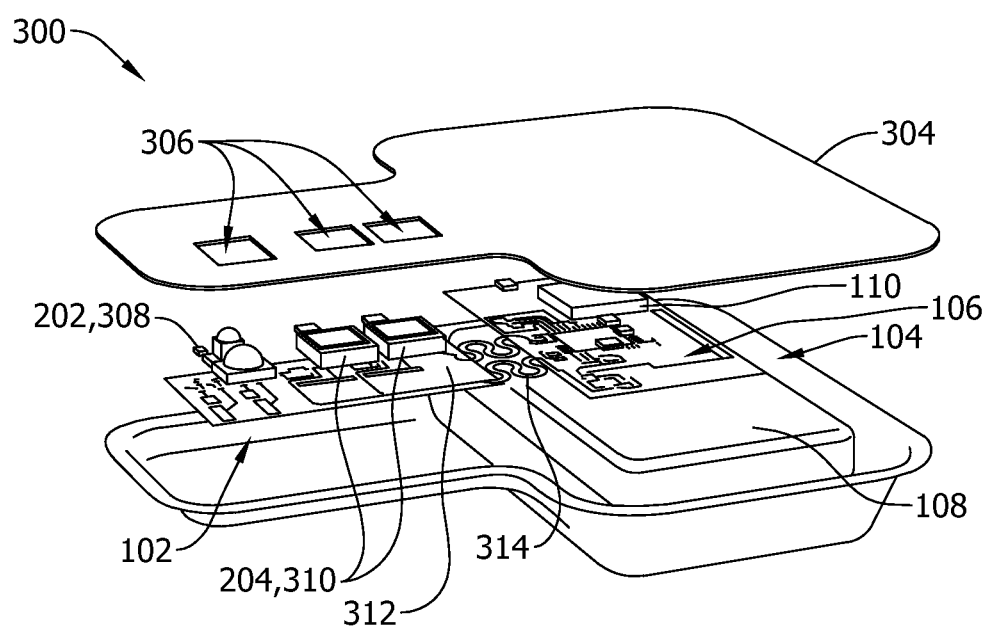
FIG. 3D is an exploded bottom-view image of the wireless conformable NIRS probe of FIG. 3A.

FIGS. 3C and 3D are exploded top-view and bottom-view schematic diagrams, respectively, illustrating the arrangement of various elements of the wireless probe in one aspect.

Openings 306 are defined through the material of the lower casing 304 that function as windows to transmit light energy produced by at least one light source 308 into the underlying skin of the patient and to transmit scattered light from the skin of the patient to at least one photodiode 310. The upper and lower casings are sealed together to define a sealed waterproof cavity containing the electronic subsystems of the wireless probe.

In various aspects, the electronic subsystems of the wireless probe may make use of any known wireless communication elements, devices, or technologies without limitation. Referring again to FIGS. 3C and 3D, the electronic subsystems of the wireless probe make use of Bluetooth Low Energy (BLE) technology in one aspect to monitor tissue oxygenation remotely through the measurement of backscattered light from the tissue. In some aspects, at least a portion of the measurements of backscattered light includes light within the near-infrared spectrum ranging from about 780 nm to about 2500 nm. Without being limited to any particular theory, the tissue oxygenation levels as measured by the disclosed probe are thought to be indicative of tissue perfusion.

In various aspects, the wireless probe includes at least two light sources (whether integrated in a single light source 308, or as a separate light sources 308) to produce light of at least two different wavelengths compatible with any suitable spectroscopic method known in the art for quantifying oxygenation of hemoglobin including, but not limited to, spatially resolved spectroscopy. Non-limiting examples of spatially resolved spectroscopy (SRS) methods are described in Suzuki et al. 1999 and Matcher et al. 1995, the contents of each which are incorporated by reference herein in their entirety. In brief, the SRS method includes detecting light of at least two wavelengths scattered over at least two distances within a tissue. Data indicative of the intensity of the scattered light is transformed into tissue absorption coefficients used to determine a tissue oxygenation index ($StO_2$).

In various aspects, the electronic subsystems of the wireless probe include at least one light source 308 to introduce light of at least one wavelength into the skin of the patient. Any light source known in the art capable of producing light at a suitable intensity, wavelength, and bandwidth suitable for performing spectroscopic detection of tissue oxygenation as described below may be used without limitation. Non-limiting examples of suitable light sources include laser diodes, light-emitting diodes (LEDs), and any other suitable light source. In some aspects, the wireless probe includes two light sources to implement monitoring of tissue oxygenation index ($StO_2$) using SDS methods as described herein. In various other aspects, the wireless probe includes at least two light sources, at least three light sources, at least four light sources, or more.

In some aspects, the light sources 308 are light-emitting diodes (LEDs) as illustrated in FIGS. 3B, 3C, and 3D. In some aspects, the LEDs include a 740 nm red light-emitting diode and an 860 nm infrared (IR) LED. In one exemplary aspect, a 740 nm red LED (QBHP684, QT Brightek) an 860 nm (IR) LED (SFH 4059, OSRAM Opto Semiconductors) are used as the light sources for the wireless probe. As illustrated in FIGS. 3B, 3C, and 3D, the light sources are positioned within a shared window through the lower casing to direct light of the two wavelengths into essentially the same position on the skin of the patient.

In various additional aspects, the electronic subsystems of the wireless probe further include at least one light detector 310 to detect light scattered from at least one position on the skin of the patient. Any suitable type of light detector known in the art may be used in the probe without limitation. In some aspects, the light detectors 310 are positive-intrinsic-negative (PIN) photodiodes. In the example embodiment, the wireless probe includes two light detectors 310 to support SDS perfusion monitoring methods as described herein.

Referring again to FIGS. 3B, 3C, and 3D, the light detectors 310 are positioned at two or more different separation distances from at least one light source 308. Without being limited to any particular theory, the separation distances of the light detectors from the light sources are selected to implement spatially resolved spectroscopy (SRS) methods as described herein. In one aspect, the wireless probe includes two PIN photodiodes (PDs) positioned at distances of 5 mm and 10 mm from the LEDs, respectively, as illustrated in FIGS. 3B, 3C, and 3D to detecting the backscattered light intensities along two light path distances within the tissue.

In various aspects, the electronic subsystems of the wireless probe 300 further include a controller 106 to coordinate the operation of the various other electronic subsystems of the wireless probe to monitor tissue oxygenation as described herein. The selection of a controller for use in the disclosed wireless probe may tradeoff between enhanced data sampling rates and reduced power consumption. Without being limited to any particular theory, high sampling rates provide real-time, high-quality $StO_2$ measurements within a short time window in support of clinical decisions based on changes in perfusion measured by the wireless probe, but at the expense of higher power consumption.

In various aspects, the controller operates the electrical subsystems of the device to support the calculation of $StO_2$ about every ten seconds or less. In various aspects, the controller 106 produces a plurality of control signals configured to operate at least one light source 308 to produce light directed into the skin of the patient, to operate the at least one light detector 310 to detect the scattered light from the skin of the patient, to acquire signals from the at least one light detector, and to communicate the light detector measurements wirelessly via BLE protocols to a computing device 116 (shown in FIG. 1) for data storage, analysis, and display. The wireless probe 300 may include any suitable controller without limitation including a microcontroller. In one exemplary aspect, the wireless probe includes a commercially available microcontroller (nRF52832, Nordic Semiconductor).

In various aspects, the electronic subsystems of the wireless probe further include a power supply 108 to provide power to at least one light source 308, at least one light detector, and the controller. Without being limited to any particular theory, battery lifetime contributes to the continuous and timely monitoring of tissue perfusion in clinical settings. Continuous probe operation over at least 5 days provides for non-interrupted monitoring of tissue perfusion during hospitalization without the need for changing the probe or battery, which reduces the personnel workload, improves the patient experience, and ensures monitoring reliability. The wireless probe may include any suitable power source without limitation. Non-limiting examples of suitable power sources include batteries. In various aspects, a power source with a relatively high energy density may be selected to reduce the size of the wireless probe. In various other aspects, the power source includes sufficient capacity to support continuous operation of the electrical subsystems of the wireless probe for about five days or more. In one aspect, the power source is a battery with a capacity of about 150 mAh. In some aspects, the power source may be rechargeable using any suitable remote recharging methods known in the art without limitation.

In various aspects, the electronic subsystems of the wireless probe are mounted to a thin flexible printed circuit board (fPCB) platform 312. Conventional rigid circuit boards and hard plastic enclosures frustrate soft, conformal adhesion to the skin, with potential consequences in reduced patient comfort and inadequate device adhesion. In various aspects, the probe may include any suitable fPCB materials known in the art without limitation. In some aspects, the fPCB platform 312 is constructed using conductive and nonconductive flexible polymers. In one exemplary aspect, illustrated in FIGS. 3C and 3D, the fPCB includes a polyimide middle layer and patterned polyimide copper layers on top and bottom surfaces that serves as the mounting platform for all electronic components. By way of non-limiting example, the fPCB includes a 75-µm-thick polyimide middle layer and 18-µm-thick patterned polyimide copper layers on top and bottom surfaces.

In various aspects, the fPCB may be provided as a single continuous surface or as two or more separate surfaces (i.e., as separate fPCB platform portions or sections) interconnected by flexible, conductive interconnects. In some aspects, the fPCB is provided as a first section and a second section interconnected by flexible conductive interconnects 314. In these aspects, the first section is configured to serve as the mounting platform for the non-sensing electronic subsystems of the wireless probe including, but not limited to, the controller and the power source. The second section is configured to serve as the mounting platform for the sensing subsystems of the wireless probe including, but not limited to, at least one light source and the at least one light detector.

By way of non-limiting example, the LEDs and PIN photodiodes form the sensing module of the probe on the second/tail section (2.4 cm×2 cm) of the fPCB, as illustrated in FIGS. 3C and 3D. The microcontroller and power source constitute the control module on the first/head section (3.6 cm×4.6 cm) of the fPCB, as illustrated in FIGS. 3C and 3D.

In various aspects, sections of the fPCB are joined by flexible interconnects 314 including, but not limited to, serpentine interconnects, a widely adopted design concept in stretchable electronics. As illustrated in FIGS. 3C and 3D, serpentine interconnects join the head and tail sections of the fPCB and mechanically isolate the thin (2.2 mm), low-modulus sensing module formed on the fPCB tail section from the thicker (7 mm), rigid control module formed on the fPCB head section. The serpentine interconnects may be formed using any suitable method known in the art including, but not limited to, laser-cutting the thin, flexible printed circuit board (fPCB) platform.

In various aspects, the flexible casing formed using low-modulus silicone elastomer and the flexible sensor module mounted on thin flexible fPCB platform is mechanically isolated from the stiffer control module portion of the probe by serpentine interconnects, resulting in enhanced compliancy and capacity for conformal contact of the sensor module onto the skin surface of a patient. The resulting wireless probe provides for an intimate contact interface between the sensing portion of the probe and the skin, even across highly non-planar surfaces. The compliant mechanics of the probe design further lead to reduced interface stresses during motions and deformations of the skin associated with patient movements, thereby facilitating a robust adhesive interface.

In various aspects, the size of the probe may be less than 100 mm along any dimension and may weigh less than about 20 grams. Without being limited to any particular theory, the small size and light weight of the disclosed wireless probe enhance patient comfort during use and reduces the footprint of the probe on the flap to be monitored as well as obstruction associated with the use of the probe. By way of non-limiting example, the disclosed wireless probe may have external dimensions of about 60 mm×46 mm×7 mm and a mass of about 13 grams. In various other aspects, the dimensions and mass of the wireless probe may vary based on any one or more of a plurality of factors including, but not limited to, the number of light detectors and light sensors, the capacity of the power source, and the inclusion of additional sensors to monitor additional patient parameters such as lactate, glucose, blood temperature, and any other suitable parameter as described herein.

In various aspects, the electrical subsystems of the probe are selected to monitor tissue oxygenation using a spatially resolved spectroscopy (SPS) method. In brief, light of at least two different wavelengths are introduced into a tissue at a first position and scattered light emerging from the tissue are detected form at least two positions on the tissue with two different separations from the first position at which the light was introduced. The intensities of light detected at the at least two detectors are transformed according to the SPS method as described above to produce estimates of at the absolute concentrations of oxyhemoglobin ($C_{HbO_2}$) and deoxyhemoglobin ($C_{HHb}$) within the tissue. These concentrations may be transformed into a tissue oxygenation index ($StO_2$) using the relation:

$$StO_2 = \frac{C_{HbO_2}}{C_{HbO_2} + C_{HHb}} \tag{1}$$

By way of non-limiting example, a wireless probe as described above includes a red LED, an IR LED, and a pair of photodetectors (PDs) used to monitor tissue oxygenation. During operation, the red and IR LEDs turn on in an alternating pattern at a frequency of 25-Hz and with a 1% duty cycle. The microcontroller may acquire signals from the two PDs and initiate transmission of these signals using a Bluetooth protocol to a computing device including, but not limited to, a smartphone or tablet for data logging, analysis, and display. In this non-limiting example, the average current consumption of the wireless probe is about 0.84 mA. At this average current consumption, a 150-mAh battery would provide a theoretical lifetime of 7.4 days.

Figure 14:
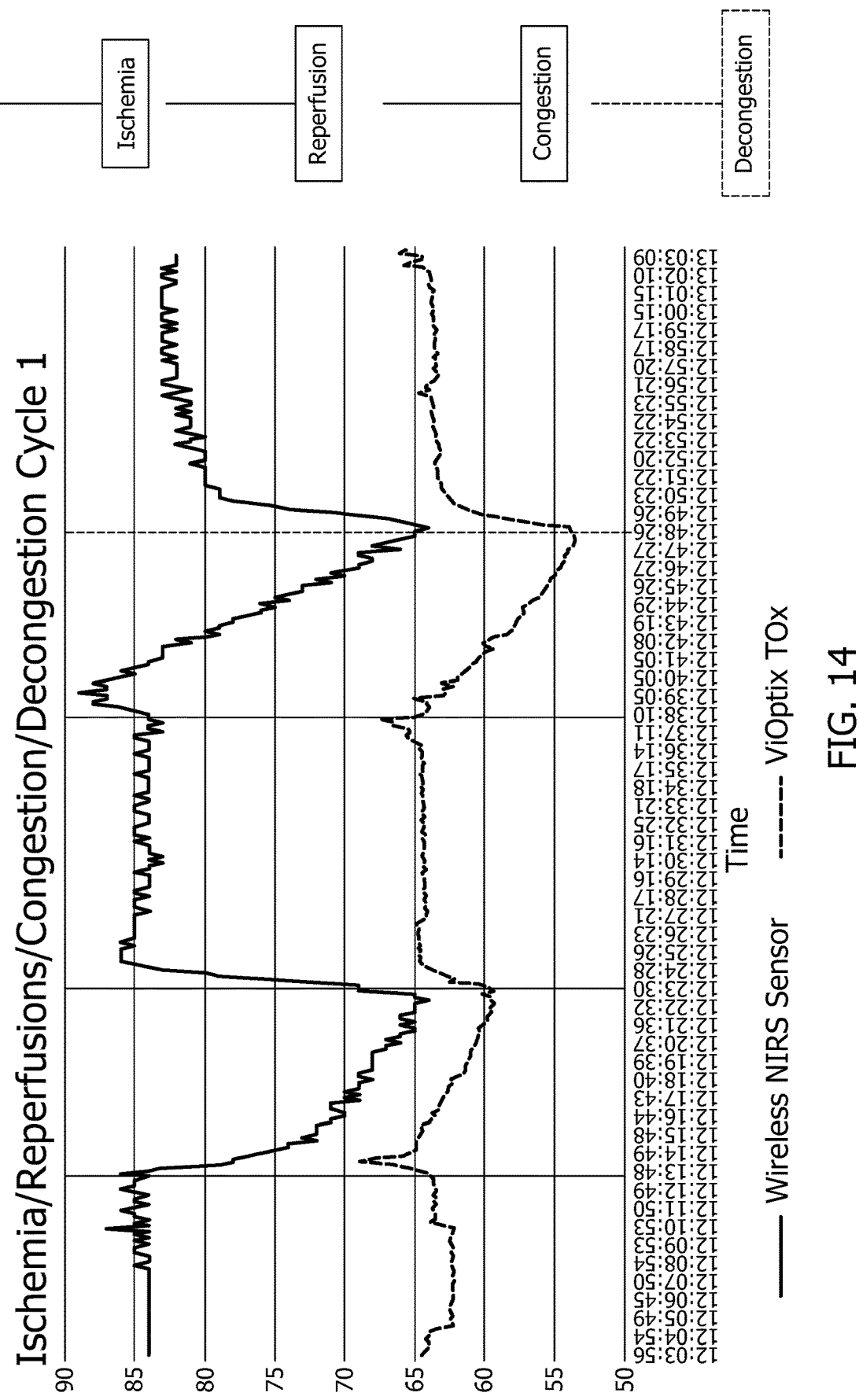
FIG. 14 is a graph summarizing readouts of a wireless NIRS probe and a ViOptix T.Ox probe attached to a flap as shown in FIG. 13A during an ischemia/reperfusion/congestion/decongestion cycle depicted in FIG. 13A (ischemia), FIG. 13B (reperfusion), FIG. 13C (congestion), and FIG. 13D (decongestion).
Figure 23:
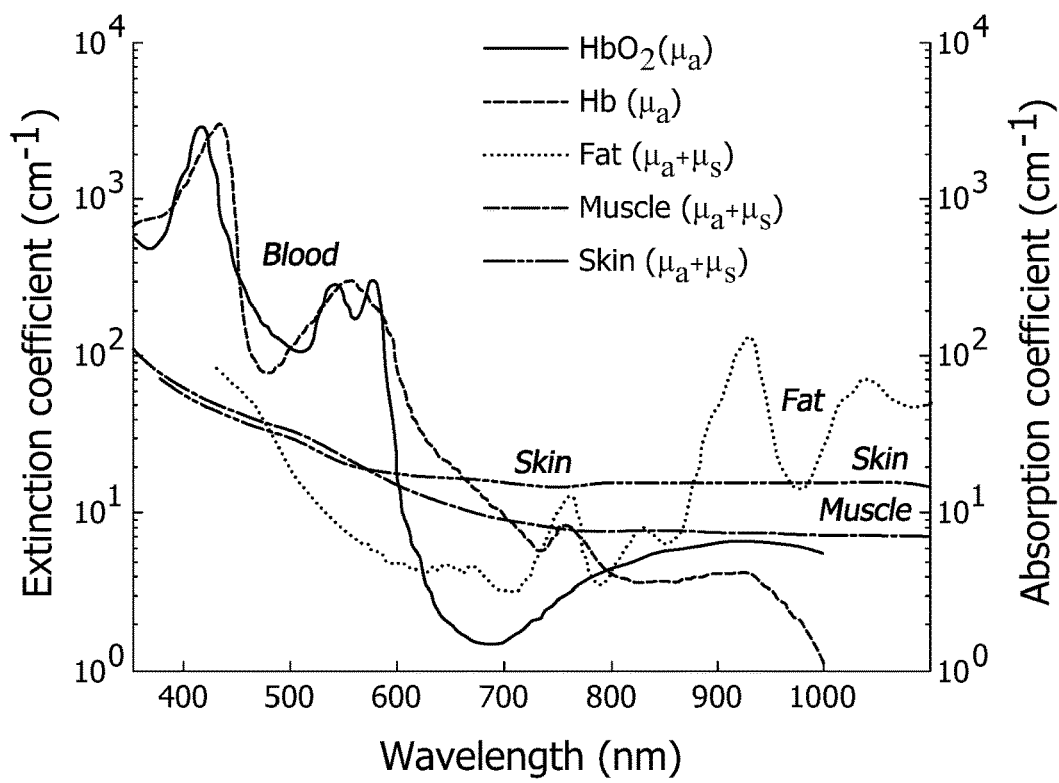
FIG. 23 is a graph summarizing absorption and extinction spectra of a variety of animal cells and tissues.

Using the computing device (e.g., mobile device 116), the signals produced by the PDs in response to the detection of scattered light from the tissue may be transformed into estimates of tissue oxygenation using the SRS methods disclosed herein. In one aspect, a custom-developed app with algorithms based on spatially resolved spectroscopy (SRS) methods may calculate and display a tissue oxygenation index ($StO_2$) every 10 seconds. By way of non-limiting example, a display of $StO_2$ produced as described above is illustrated in FIG. 14. Without being limited to any particular theory, the SRS method, unlike differential spectroscopy (DS) methods, determine the absolute concentrations of oxyhemoglobin ($C_{HbO_2}$) and deoxyhemoglobin ($C_{HHb}$), leading to the calculation of $StO_2$ as described above. In some aspects, the SRS method determines tissue oxygenation index ($StO_2$) based on the optical properties of blood as described above. In other aspects, the SRS method determines tissue oxygenation index (StO$_2$) based on the optical properties of blood as well as the optical properties of various additional tissues (see, e.g., FIG. 23) including, but not limited to, muscle, fat, skin, and any other relevant tissue.

Figure 40:
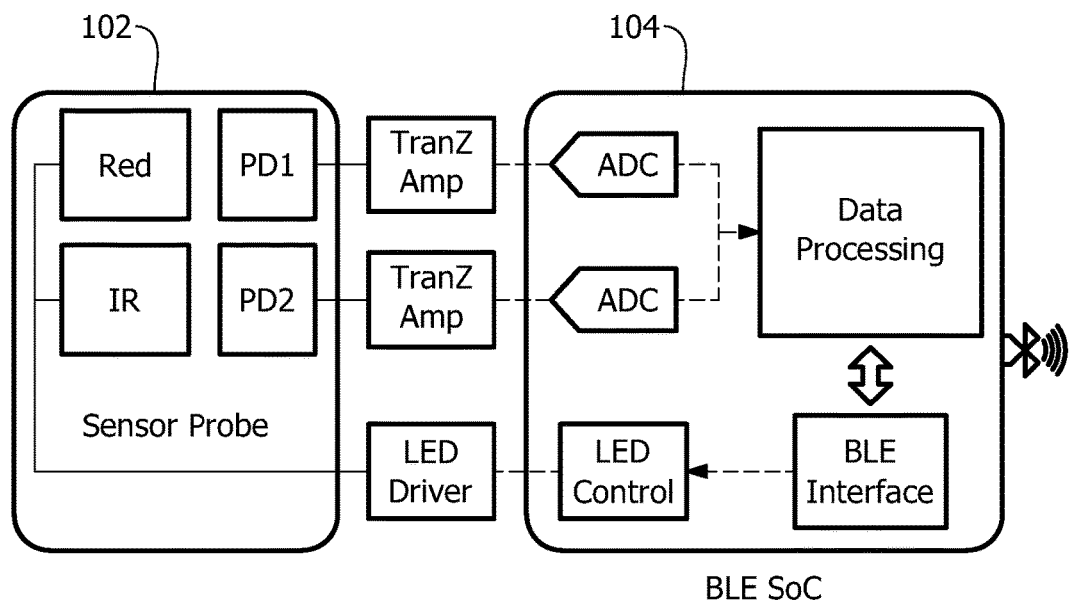
FIG. 40 is a schematic block diagram of an example NIRS probe.
Figure 41:
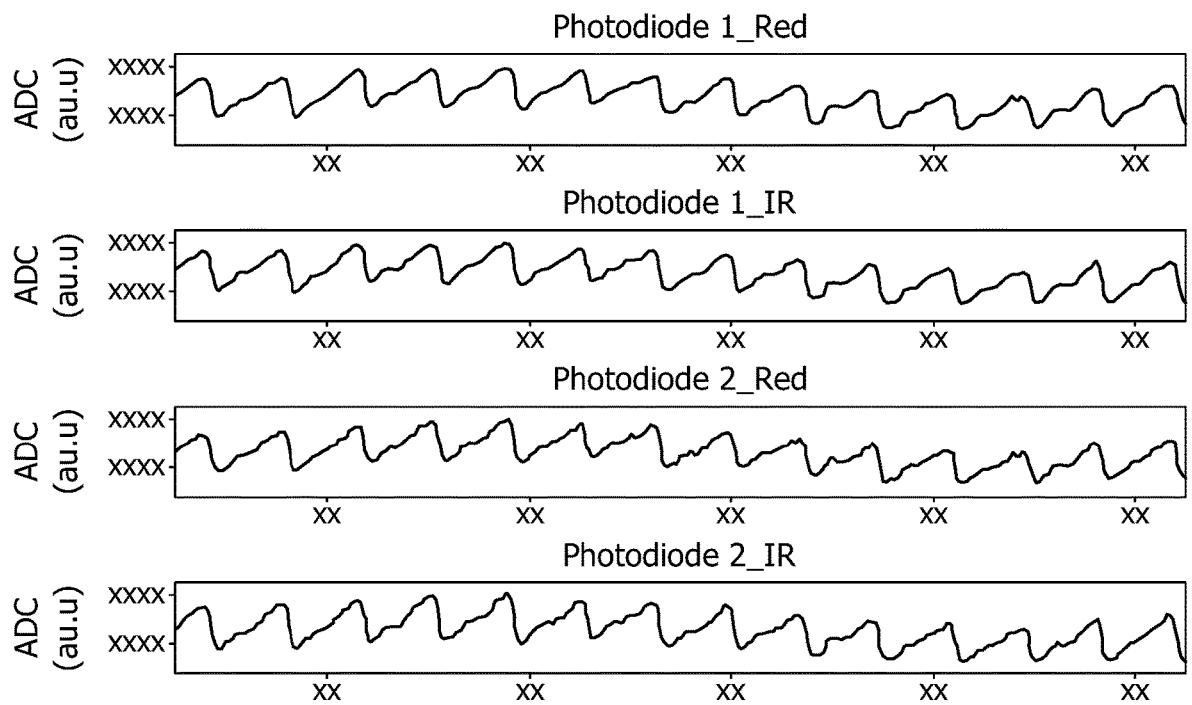
FIG. 41 is an example display of measurement results of pulse signals collected from an index finger using the example NIRS probe of FIG. 40.
Figure 42:
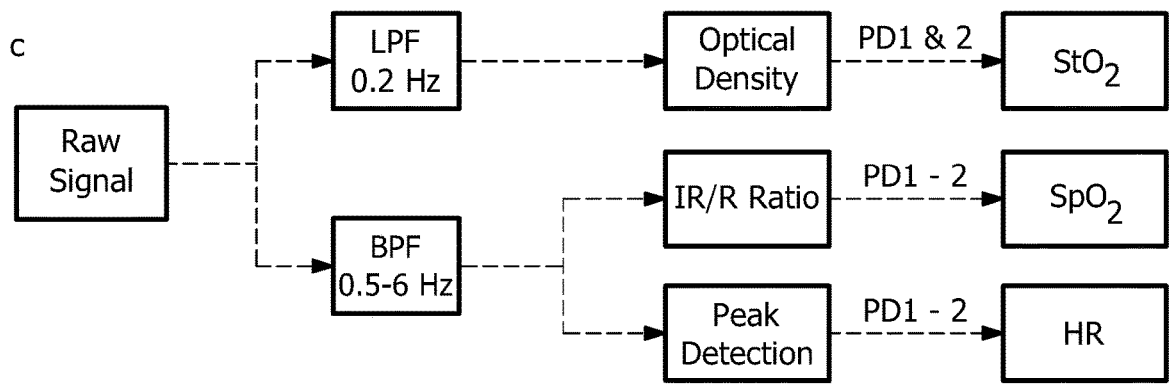
FIG. 42 is an example algorithm flow chart of data analysis to extract tissue oxygenation ($StO_2$), pulse oxygenation saturation ($SpO_2$), and heat rate (HR).

FIG. 40 is another schematic block diagram of an example NIRS probe including two photodetectors and two LEDs emitting different wavelengths. FIG. 41 is an example display of measurement results of pulse signals collected from an index finger using the example NIRS probe of FIG. 40. FIG. 42 is an example algorithm flow chart of data analysis to extract tissue oxygenation (StO$_2$), pulse oxygenation saturation (SpO$_2$), and heat rate (HR) The algorithm includes the use of a low pass filter (LPF), and a high pass filter (HPF). IR/R ratio is the ratio of infrared signals to red signals.

Figure 16:
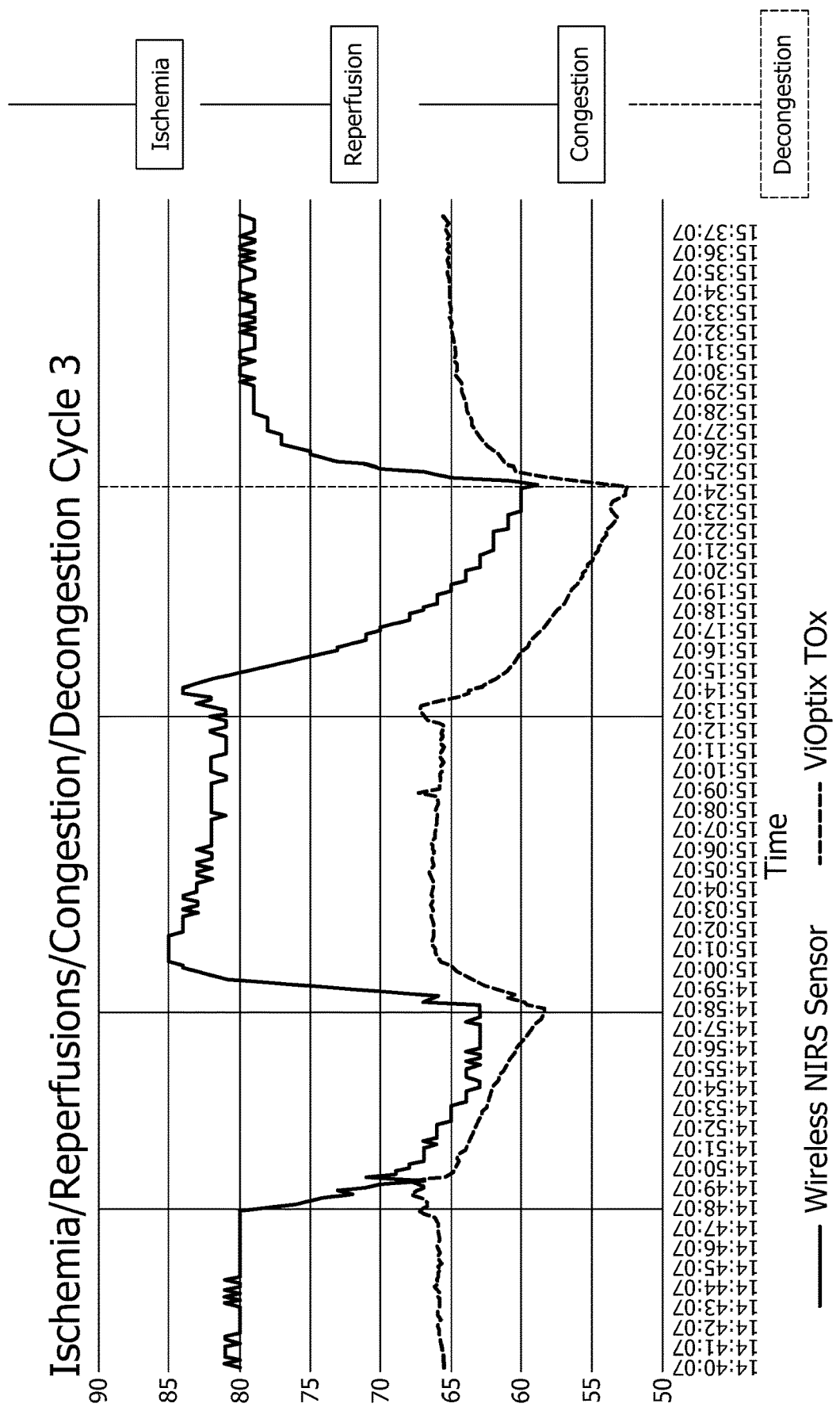
FIG. 16 is a graph summarizing readouts of a wireless NIRS probe and a ViOptix T.Ox probe attached to a flap as shown in FIG. 13A during a second ischemia/reperfusion/congestion/decongestion cycle depicted in FIG. 13A (ischemia), FIG. 13B (reperfusion), FIG. 13C (congestion), and FIG. 13D (decongestion).
Figure 22:
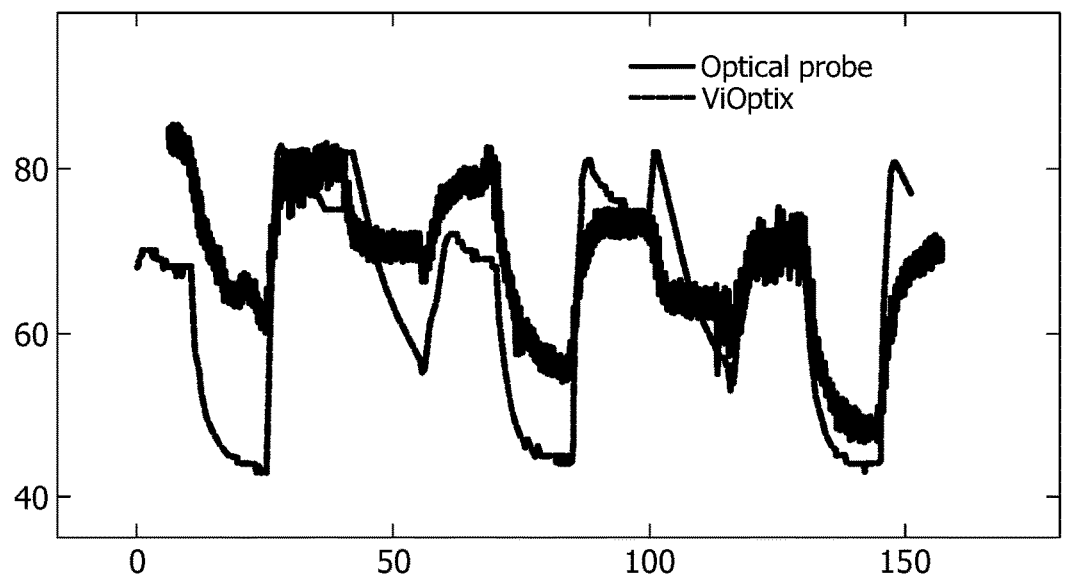
FIG. 22 is a graph summarizing readouts of a wireless NIRS probe (black, Optical probe) and a ViOptix T.Ox probe (red, ViOptix) attached to a bilateral porcine rectus abdominus myocutaneous flap as shown in FIG. 17A during several cycles of ischemia/reperfusion/congestion/decongestion; the wireless NIRS probe readings were based on optical properties of blood and muscle tissue.

One non-limiting example of StO$_2$ measurements obtained using the SRS method based on blood optical properties is shown in FIG. 16. Another non-limiting example of StO$_2$ measurements obtained using the SRS method based on blood and muscle optical properties is shown in FIG. 22. As illustrated in FIGS. 16 and 22, and as further described in the examples below, the StO$_2$ measurements obtained using the wireless SRS probe are congruent with corresponding readings from an existing wired NIRS oxygen monitoring device (T.Ox) and support essentially identical clinical findings.

Figure 4:
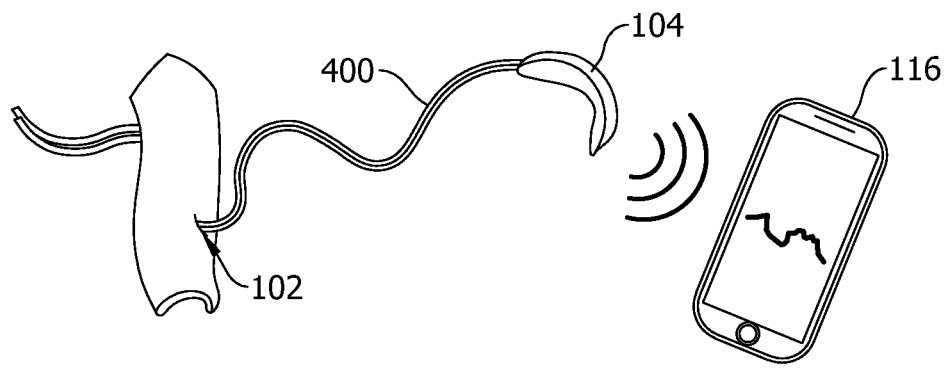
FIG. 4 is an example probe as shown in FIG. 1, including an implantable sensor module connected by a cable to the control module.
Figure 5:
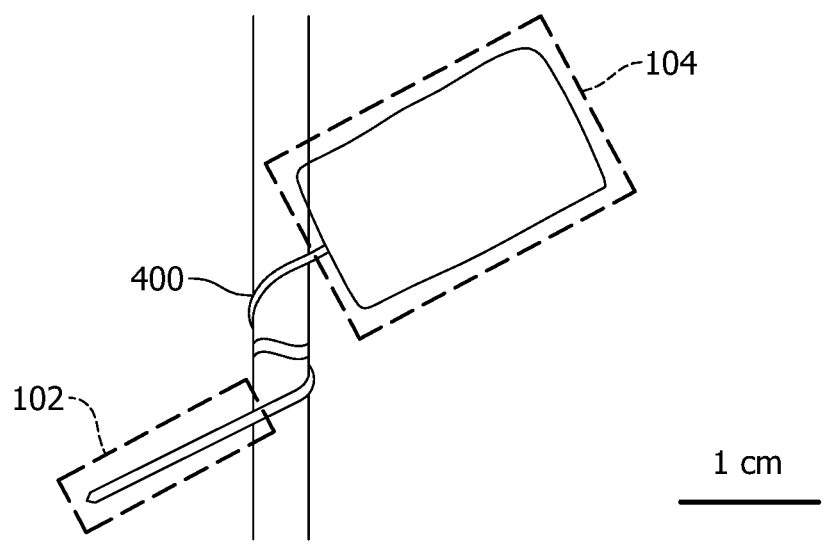
FIG. 5 is another example probe as shown in FIG. 1 including an implantable sensor module connected by a cable to the control module.
Figure 25:
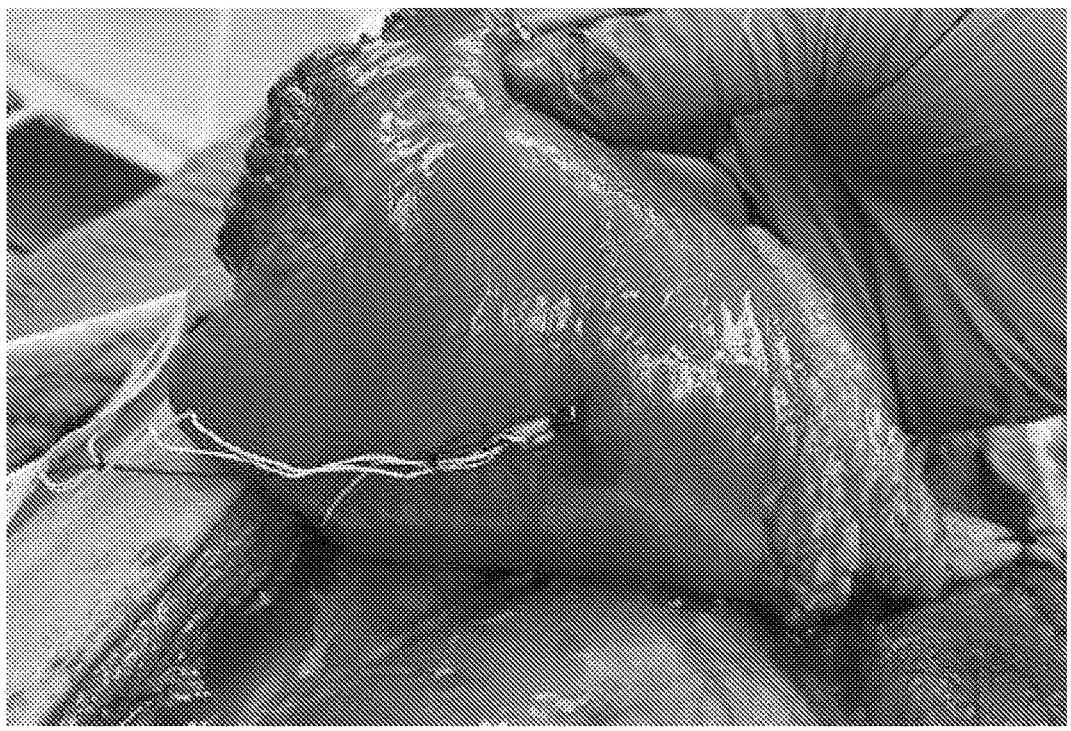
FIG. 25 is an image of an NIRS probe implanted within a porcine rectus abdominus myocutaneous flap in accordance with one aspect of the disclosure.
Figure 27:
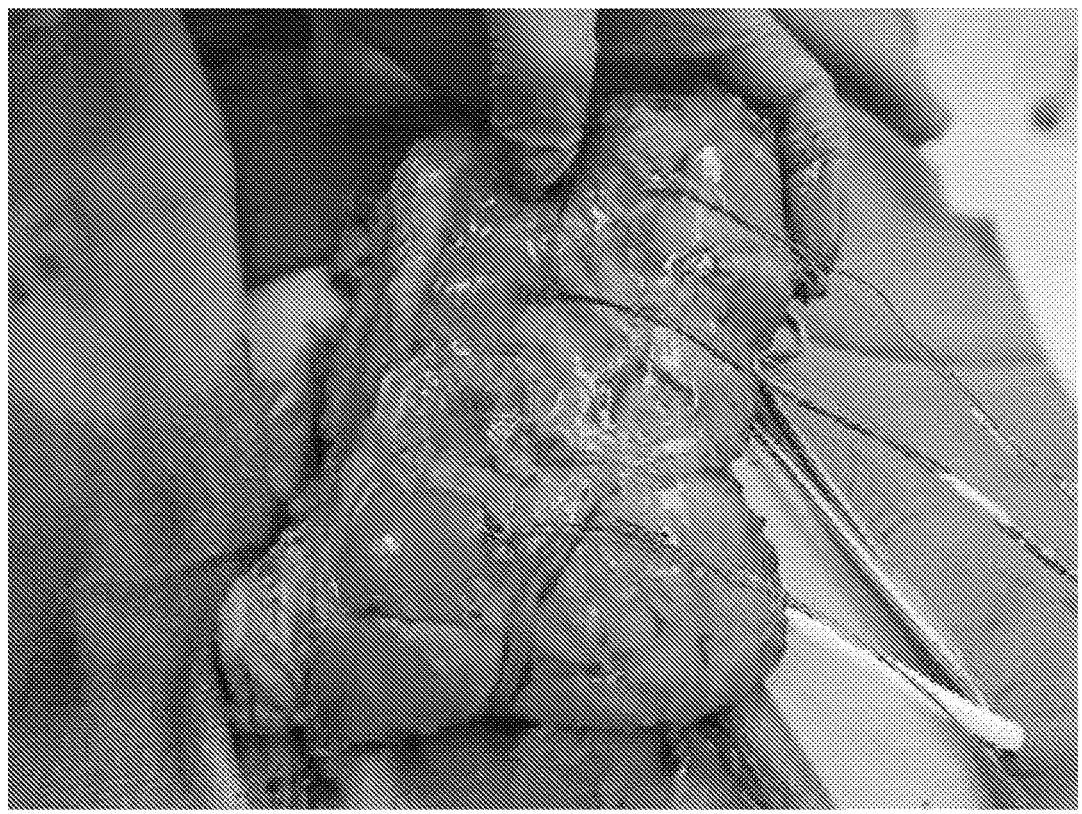
FIG. 27 is an image of multiple MRS probes implanted within a porcine rectus abdominus myocutaneous flap in accordance with one aspect of the disclosure.
Figure 26:
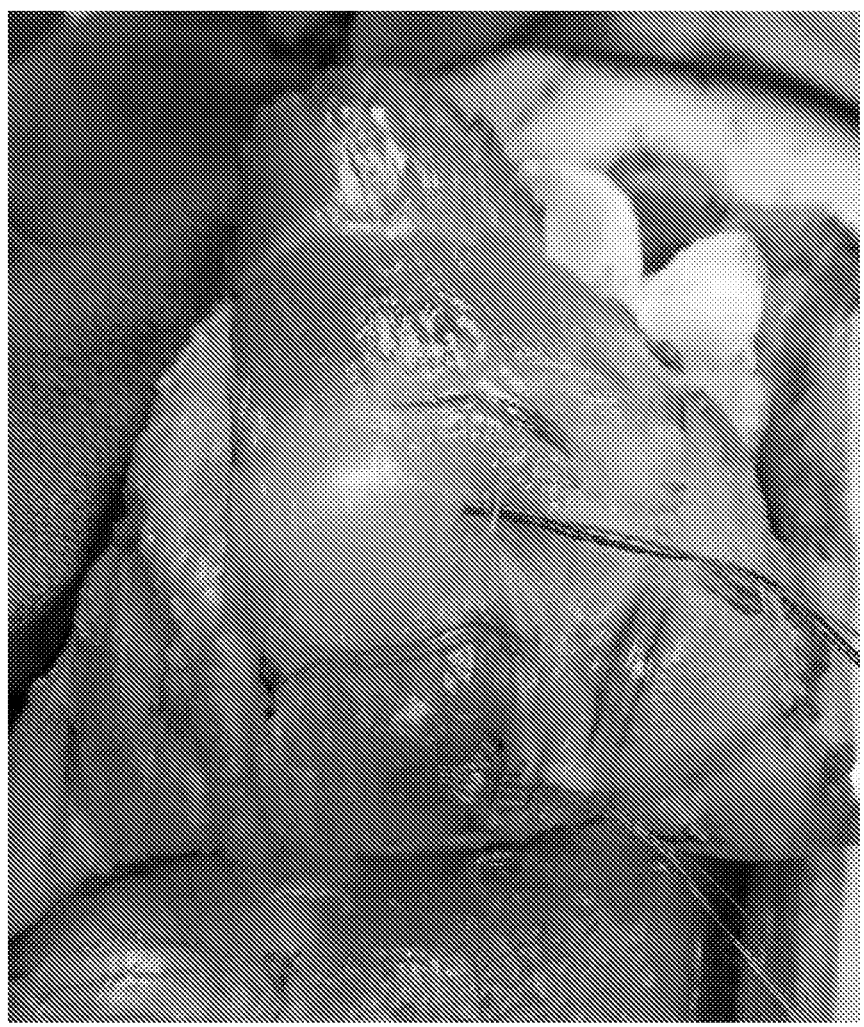
FIG. 26 is an image of the implanted NIRS probe of FIG. 25 during operation of the probe.

In various additional aspects, the SRS probes may be provided in the form of cabled elements, as illustrated in FIGS. 4 and 5. In these aspects, an implantable sensor module 102 including light sources may be implanted in one position within a flap (see FIGS. 25 and 26) and at least two light detectors may be implanted at various distances from the light source (see FIG. 27). One or more cables 400 are connected to the light sources and light detectors to provide power and data transfer between the control module 104 and the implanted sensor module 102. The control module transmits the received data to the remote device 116 for data analysis and display as described above.

Figure 6A:
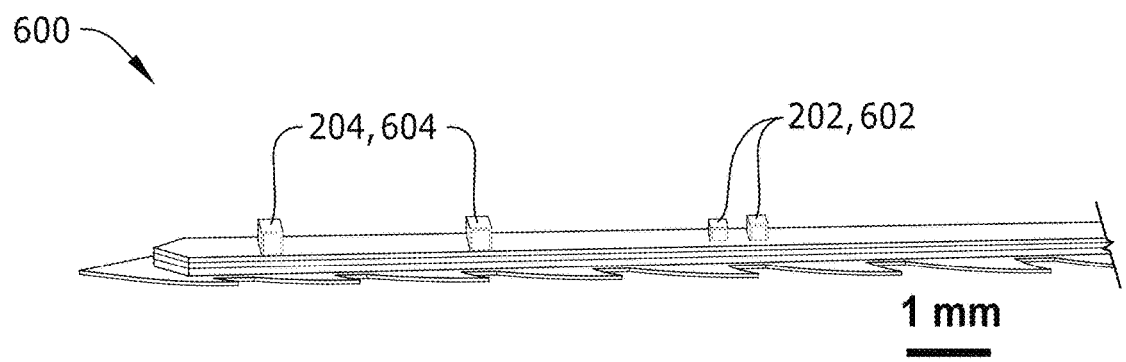
FIG. 6A is a side view of an example implantable sensor module that may be used as the sensor module shown in FIGS. 4 and 5.
Figure 6B:
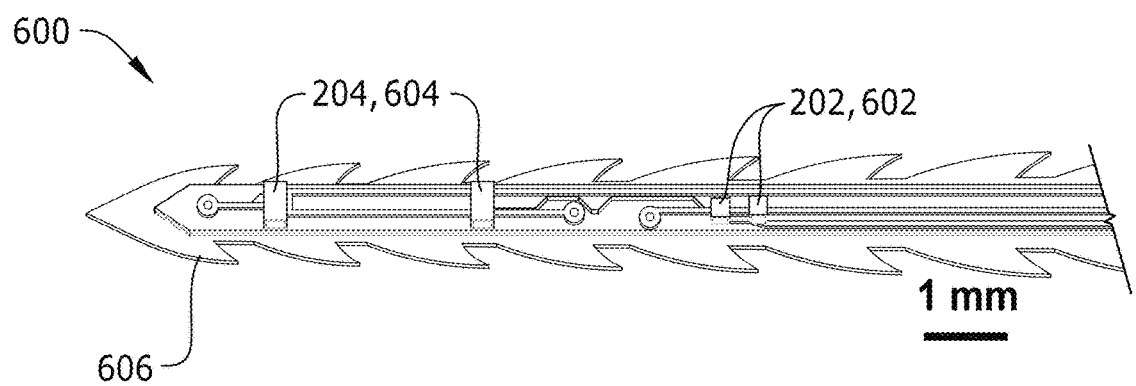
FIG. 6B is a top view of an example implantable sensor module shown in FIG. 6A
Figure 6C:
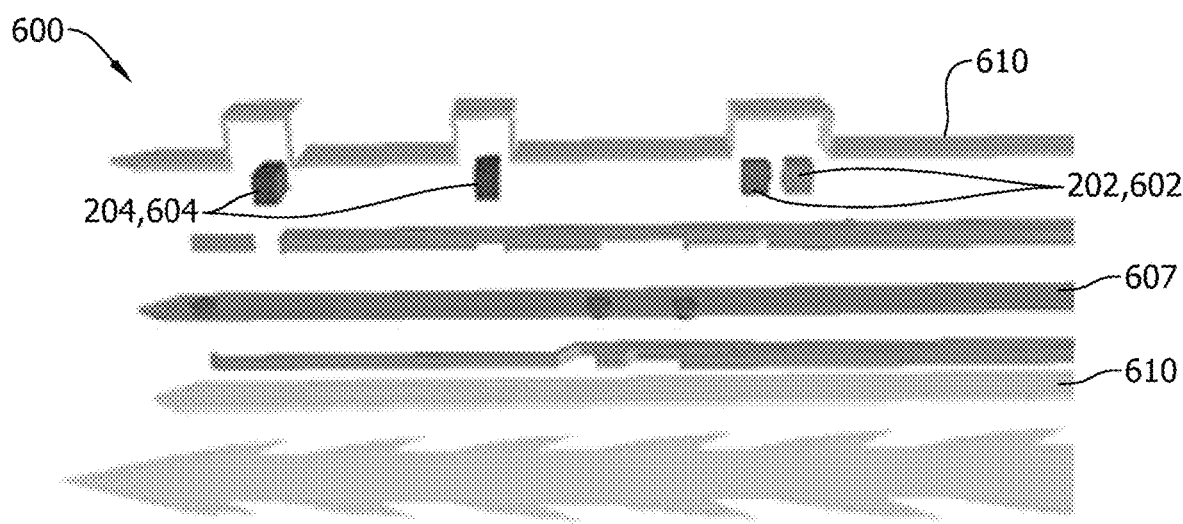
FIG. 6C is an exploded view of the implantable sensor module shown in FIGS. 6A and 6B.

FIGS. 6A and 6B are views of an example implantable sensor module 600 that may be used as the sensor module 102 shown in FIGS. 4 and 5. FIG. 6C is an exploded view of the implantable sensor module 600.

The sensor module 600 includes two LED light sources 602 as transmission source 202, and two photodetectors 604 as detectors 204. The sensor module 600 includes barbs 606 to facilitate anchoring the sensor module 600 stably in a designated implantation site in tissue. In the example embodiment, the barbs 606 are bioresorbable barbs that will dissolve over time when implanted in tissue to allow for facile removal afterward. The material, size, and shape of the barbs may be selected to allow the barbs to remain intact for the desired implantation length and for the desired stability. For example, in some embodiments, the barbs are made of poly(lactic-co-glycolic acid) (PLGA), with a thickness of 50 μm, total barb depth 300 μm, barb angle 54°, throat angle 22°, throat length 1.30 mm, spacing 1.35 mm without kick-up. In other embodiments, non-bioresorbable barbs or barbs made with a different bioresorbable material may be used. Moreover, the shape of the barbs may be varied to achieve different levels of stability of implantation in different locations, types of tissue, or for any other purpose.

Figure 7A:
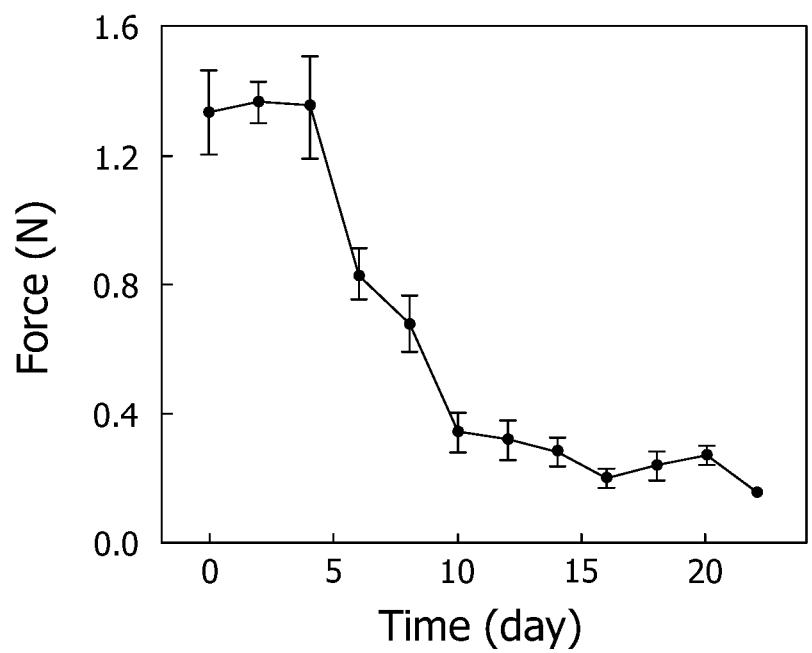
FIG. 7A is a profile showing the representative change of the maximum pulling force of a resorbable, barbed sensor module as a function of time of immersion in phosphate buffer solution (PBS) at 37° C.
Figure 7B:
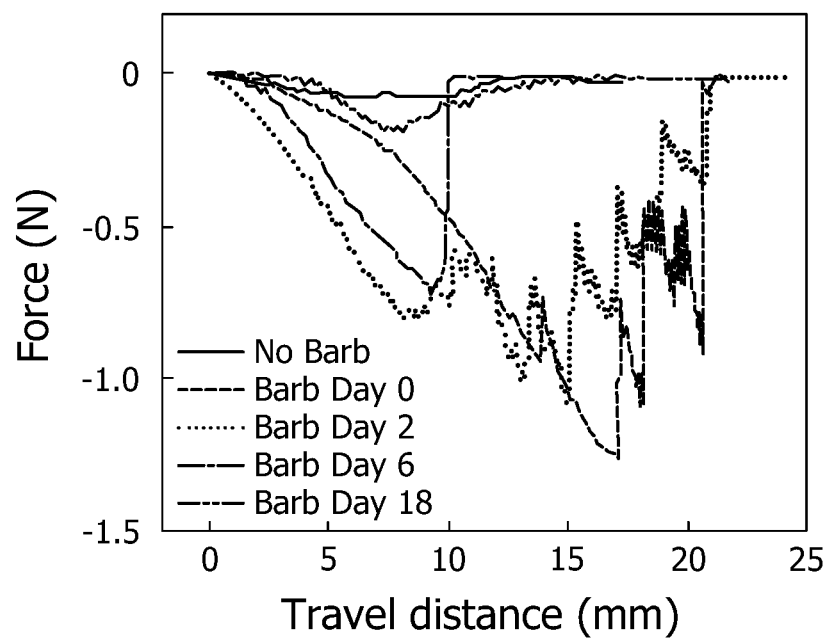
FIG. 7B is a profile comparing the pulling force required to remove unbarbed and resorbable barbed probes from porcine meat as a function of travel distance.

This structure automatically secures the probe surrounding soft tissue during the process of insertion to the targeted site. After resorption, for sensor modules including resorbable barbs, the sensor module can be easily removed from the tissue. FIGS. 7A and 7B present representative profiles of the pulling force required to remove barbed probes from porcine meat and the change of the maximum pulling force as a function of time of immersion in phosphate buffer solution (PBS) at 37° C.

Figure 8:
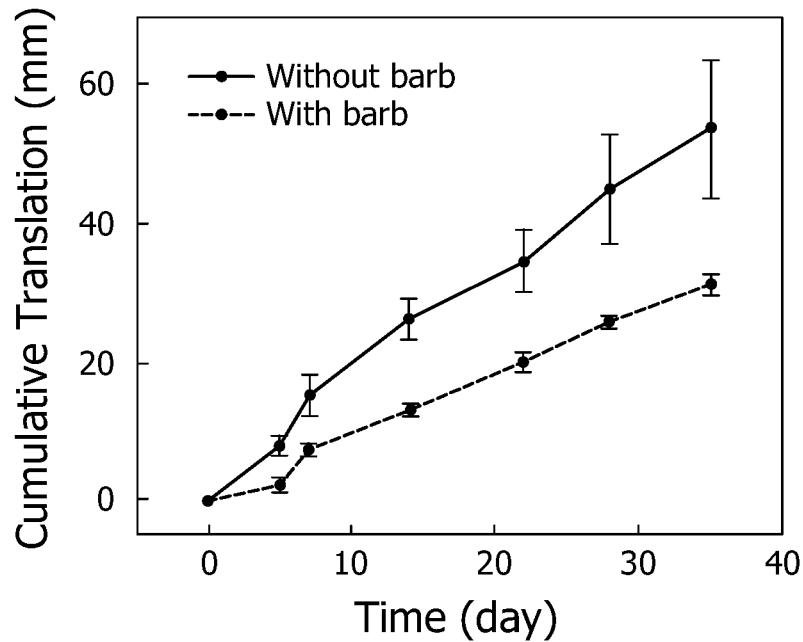
FIG. 8 is a graph of the cumulative translation distance relative to the spine for an implanted probe with and without barbs.

The probe is compatible with and visible under conventional imaging technologies including X-ray computed tomography (Micro-CT). FIG. 8 summarizes the cumulative translation distance relative to the spine for a probe with and without barbs, where the probe with barbs shows minimal movement until day 7. FIGS. 9A-D are a series of CT images at various stages of implantation of a barbed sensor module inside subcutaneous regions of a rat model, and FIGS. 10A-D are a series of CT images at various stages of implantation of a non-barbed sensor module inside subcutaneous regions of a rat model. These further demonstrate the effectiveness of the barbed structure in mechanical stabilization. Implanted probes in subcutaneous tissue of freely moving rats show negligible changes in location and orientation until significant bioresorption occurs at 10-14 days post-implantation. By comparison, probes without the barbed structures show significant rotations, translations, and other types of movement throughout the period of observation. The barbs begin to soften and change in appearance from transparent to white after soaking in PBS for 6 days. Significant disintegration occurs by day 10, thereby facilitating extraction of the sensor module.

With reference to FIG. 6C, the light sources 602 and photodetectors 204 are mounted on a flexible PCB 607 with conductors 608. This assembly is encapsulated in a transparent, biocompatible encapsulation layer 610 coated onto the device as a biofluid barrier. In the example embodiment, the encapsulation layer is a 14 μm thick coating of parylene. Other embodiments may use any suitable biocompatible encapsulation layer. The bioresorbable barbs 606 are then attached to the bottom side of the encapsulated assembly.

Figure 11:
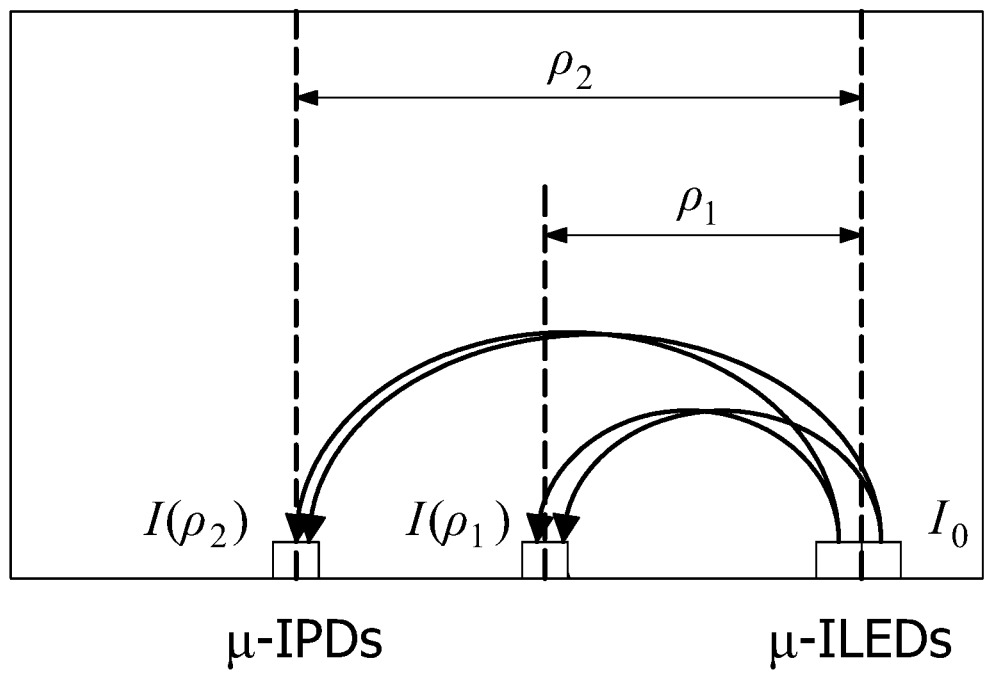
FIG. 11 is a schematic illustration of the principle of spatially resolved spectroscopy with two photodetectors and two different wavelength light sources.
Figure 9A:
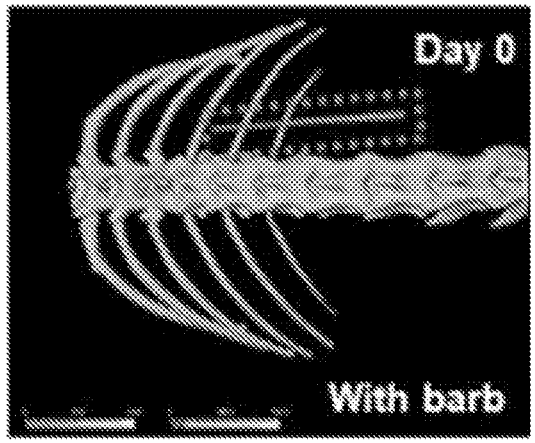
FIG. 9A is a CT image on day 0 of implantation of a barbed sensor module inside subcutaneous regions of a rat model.
Figure 9B:
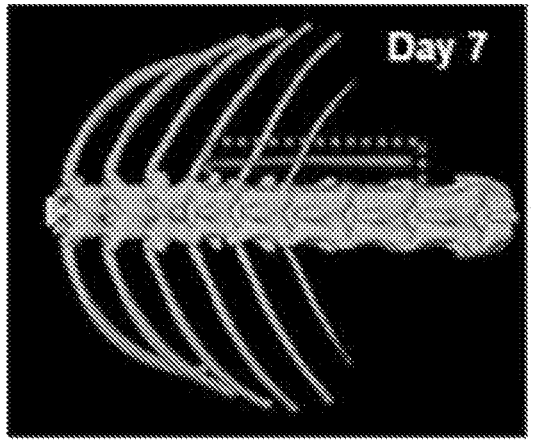
FIG. 9B is a CT image on day 7 of implantation of a barbed sensor module inside subcutaneous regions of a rat model.
Figure 9C:
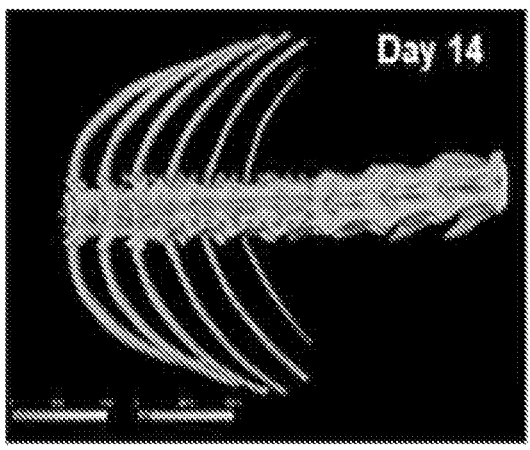
FIG. 9C is a CT image on day 14 of implantation of a barbed sensor module inside subcutaneous regions of a rat model.
Figure 9D:
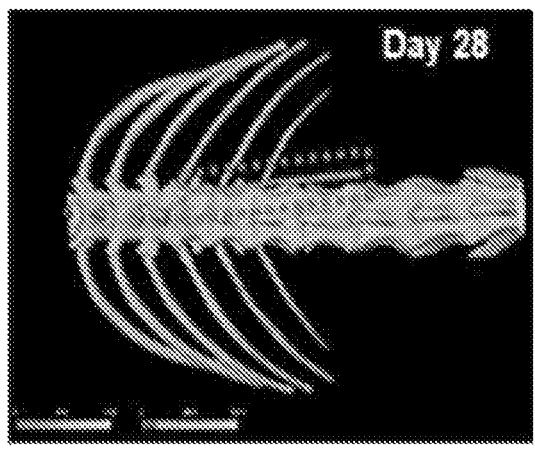
FIG. 9D is a CT image on day 28 of implantation of a barbed sensor module inside subcutaneous regions of a rat model.
Figure 10A:
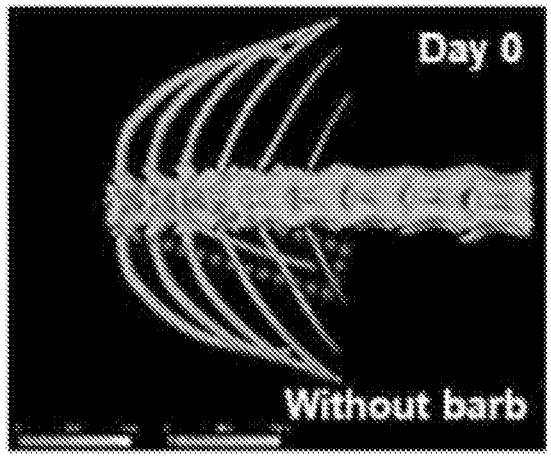
FIG. 10A is a CT image on day 0 of implantation of a non-barbed sensor module inside subcutaneous regions of a rat model.
Figure 10B:
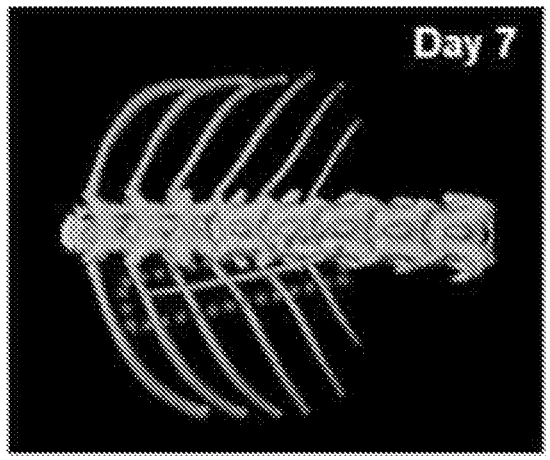
FIG. 10B is a CT image on day 7 of implantation of a non-barbed sensor module inside subcutaneous regions of a rat model.
Figure 10C:
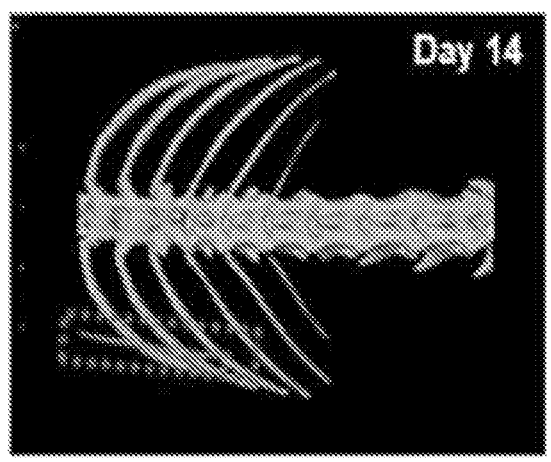
FIG. 10C is a CT image on day 14 of implantation of a non-barbed sensor module inside subcutaneous regions of a rat model.
Figure 10D:
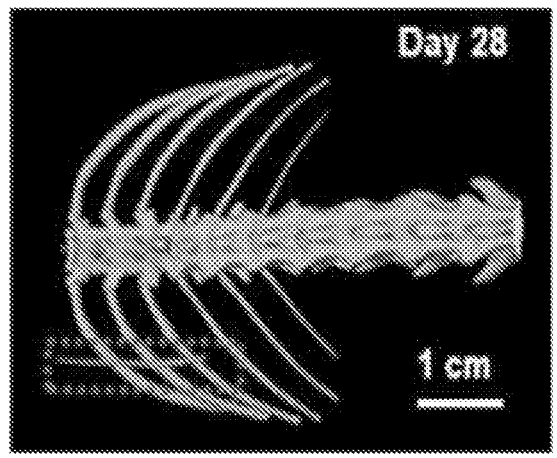
FIG. 10D is a CT image on day 28 of implantation of a non-barbed sensor module inside subcutaneous regions of a rat model.

FIG. 11 is a schematic illustration of the principle of spatially resolved spectroscopy with two photodetectors and two different wavelength light sources. For optical based sensors such as are described above, StO$_2$ may be calculated from:

$$\begin{bmatrix} kC_{Hb} \\ kC_{HbO2} \end{bmatrix} = \frac{1}{\ln(10)} \begin{bmatrix} \varepsilon_{Hb,\lambda_1} & \varepsilon_{HbO2,\lambda_1} \\ \varepsilon_{Hb,\lambda_2} & \varepsilon_{HbO2,\lambda_2} \end{bmatrix}^{-1} \begin{bmatrix} k\mu_{a,\lambda_1} \\ k\mu_{a,\lambda_2} \end{bmatrix} \quad (2)$$

and $$StO_2 = \frac{C_{HbO2}}{C_{HbO2} + C_{Hb}} = \frac{kC_{HbO2}}{kC_{HbO2} + kC_{Hb}} \quad (3)$$

$$StO_2(t) = \frac{C_{HbO2}(t)}{C_{HbO2}(t) + C_{HHb}(t)} = \frac{C_{Hb,t} * StO_2(t=0) + \Delta C_{HbO2}(t)}{C_{Hb,t} * StO_2(t=0) + \Delta C_{HbO2}(t) + C_{Hb,t} * (1 - StO_2(t=0)) + \Delta C_{Hb}(t)} \quad (4)$$

Where $\rho_{1\ or\ 2}$ are distances of photodetectors from the LEDs, $\mu_{a,\lambda_1\ or\ 2}$ is the light absorption coefficient at the emission wavelengths $\lambda_{1\ or\ 2}$ based on the gradient of absorbance $$\frac{\partial A}{\partial \rho}, A_{\lambda_{1\ or\ 2}, \rho_{1\ or\ 2}}$$

are absorbances $\lambda_1$ and $\lambda_2$, respectively at distances $\rho_1$ and $\rho_1$, k is a constant $\varepsilon_{Hb}$ or $H_{bO_2,\lambda_{1\ or\ 2}}$ are the specific molar extinction coefficients corresponding to the wavelengths $\lambda_1$ and $\lambda_2$, respectively, and deoxygenated and oxygenated181 blood, repectively. Designs that use only one detector require a baseline calibration with the initial total hemoglobin concentration, $C_{Hb,t}$ and initial $StO_2$ level (t–0) typically obtained by estimation or an external measurement of reference materials. The use of two or more phtotodetectors, as described herein, supports spatially resolved spectroscopy with improved accuracy in measurement of $StO_2$ by eliminating the need to approximate the initial total hemoglobin- .concentration or the initial $StO_2$ level.

Operation of the two LED light sources involves currents of about 1.7 mA and 3.0 mA, corresponding to optical powers of 0.77 mW and 0.58 mW, for red and IR LEDs, respectively. A 10% duty cycle reduces power consumption and minimizes heat generation, as demonstrated both experimentally and computationally. When an example device was operated in porcine meat or on skin for 5 minutes, steady state increases intemperature of ~0.2° C. occurred, which represents minimal risk. Increases in temperature in tissue adjacent to the probe can be determined by finite element analysis (FEA). For an initial value of 19.9° C., the peak temperature reaches ~20.3° C. after 5 minutes. All four locations evaluated in these simulations show increases that are less than 0.25° C., where distances larger than 1.5 mm have increases in temperature less than 0.1° C.

b. Thermal Conductivity Probes

Figure 32:
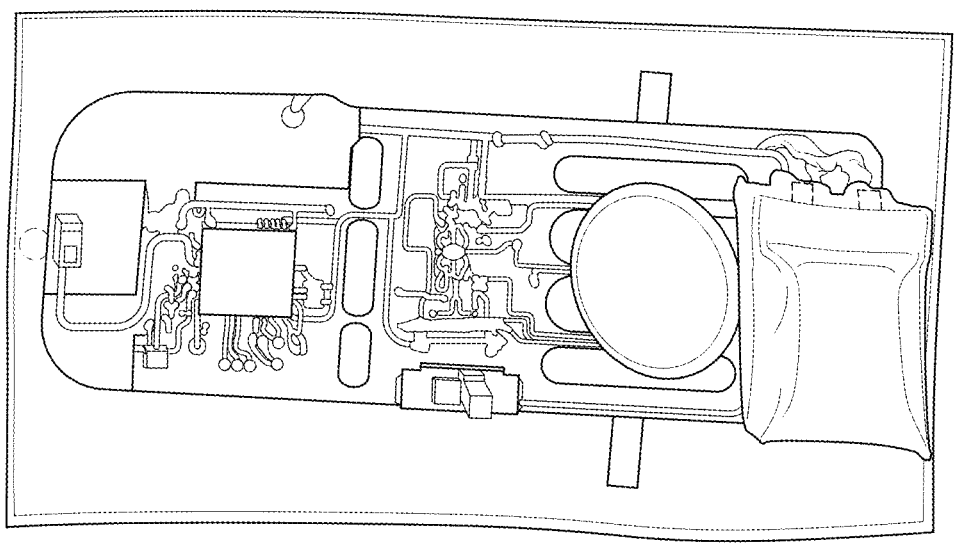
FIG. 32 is an image of elements of a wearable wireless thermal probe in accordance with one aspect of the disclosure.
Figure 32:
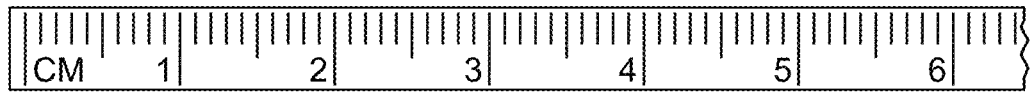

In various other aspects, a wireless thermal conductivity probe is disclosed that monitors perfusion of a tissue using thermal conductivity measurements. FIG. 32 is an image of an example wireless thermal conductivity probe in one aspect. In some aspects, the wireless thermal conductivity probe includes a heating element configured to heat a portion of the skin and at least two temperature sensors to detect skin temperature. Each of the temperature sensors is located at different positions relative to the heater. Any suitable arrangement of the temperature sensors relative to the heater may be included in the thermal conductivity probe without limitation. In some aspects, the temperature sensors may be arranged at various separation distances away from the heater. In other aspects, the heater may be positioned between portions of the temperature sensors.

In various aspects, the heater of the thermal conductivity probe may be any suitable heater without limitation including, but not limited to, a resistive heater. In various other aspects, the temperature sensors of the thermal conductivity probe may be any suitable temperature sensors without limitation. Non-limiting examples of suitable temperature sensors include semiconductor heat sensors.

Figure 33:
FIG. 33 is an image of a wearable wireless thermal probe attached to a porcine rectus abdominus myocutaneous flap in accordance with one aspect of the disclosure.

In some aspects, the semiconductors and heater of the thermal conductivity probe are positioned between two electrically insulating polyimide (PI) layers mounted on a soft silicone substrate (Ecoflex, Smooth-On, Inc.). The biocompatible silicone provides a flexible adhesive surface to enhance contact of the thermal conductivity probe with the underlying skin. FIG. 33 shows an image of a thermal conductivity probe adhered to a skin flap in accordance with one aspect of the disclosure.

In various aspects, the thermal conductivity probe includes additional electronic subsystems similar to the subsystems described above in association with the SRS probe. In some aspects, the thermal conductivity probe includes a controller to coordinate the operation of the various other electronic subsystems of the probe and a power source to provide power to the other electronic subsystems. In one aspect, the controller may be further provided with a wireless communication module to transmit signals from the thermal conductivity probe to a computing device in accordance with a wireless data transmission protocol including, but not limited to, a Bluetooth low energy (BLE) protocol, as described above. In other aspects, the heater, at least two temperature sensors, and other electronic subsystems are mounted to a thin flexible printed circuit board (fPCB) platform similar to one or more fPCB configurations as described above.

In various aspects, the controller is configured to operate the heater, to acquire signals indicative of skin temperature from the temperature sensors, and to transmit the acquired signals wirelessly to a computing device. In some aspects, the thermal conductivity probe includes a controller to operate the heater, to acquire signals indicative of skin temperature from the temperature sensors, and to transmit the acquired signals to a computing device. Without being limited to any particular theory, semiconductors farther from the heater will report a temperature lower than the semiconductors closer to the heater. The differential between the temperature readings of semiconductors at different separation distances from the heater will be higher if there is blood flowing in the tissue and lower if there is no blood flowing in the tissue.

In various aspects, the computing device transforms the transmitted signals indicative of skin temperature into differential temperature readings. The computing device further transforms the differential temperature readings into an estimation of blood flow speed using a flow model. The blood flow speed may be estimated using any suitable flow or heat transfer model without limitation. Non-limiting examples of suitable flow or heat transfer models include a forced convection model.

Figure 34:
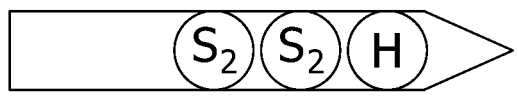
FIG. 34 is diagram of a forced convection model used to estimate flow rate based on temperatures obtained from two temperature sensors S1 and S2 positioned relative to a heater H.

By way of non-limiting example, a forced convection model may be used to estimate flow rate based on temperatures obtained from two temperature sensors $S_1$ and $S_2$ positioned relative to a heater H as illustrated in FIG. 34. The forced convection model includes a relationship between temperatures $T_1$ and $T_2$ as measured by $S_1$ and $S_2$, respectively, and a flow speed of blood through the tissue underlying the heater and sensors, as expressed by the following equation:

$$\Delta T \approx \frac{\Delta T_0}{1 + 1.33\beta k \sqrt{\frac{V}{\alpha D}}} \qquad \text{Eqn. (1)}$$

where $\Delta T = T_1 - T_2$; $\Delta T_0$ is $\Delta T$ at $V=0$; $\alpha$ is diffusivity; $\beta$ is temperature-heating power coefficient; D is diameter of the heaters and temperature sensors; k is thermal conductivity; and V is flow speed.

In accordance with the forced convection model, $\Delta T_0$ is given by the equation:

$$\Delta T_0 = \frac{CP}{k} \qquad \text{Eqn. (2)}$$

Substitution of Eqn. 1) into Eqn. (2) produces the following equation:

$$\Delta T \approx \frac{\frac{CP}{k}}{1 + 1.33\beta k \sqrt{\frac{V}{\alpha D}}} \approx \frac{CP}{k}\left(1 - 1.33\beta k \sqrt{\frac{V}{\alpha D}}\right) \qquad \text{Eqn. (3)}$$

Eqn. (3) may be divided into first and second terms representing thermal conductivity and flow effects on the differential temperature $\Delta T$:

$$\Delta T \approx \frac{CP}{k} - 1.33 \beta CP \sqrt{\frac{V}{\alpha D}} \qquad \text{Eqn. (4)}$$

Figure 21A:
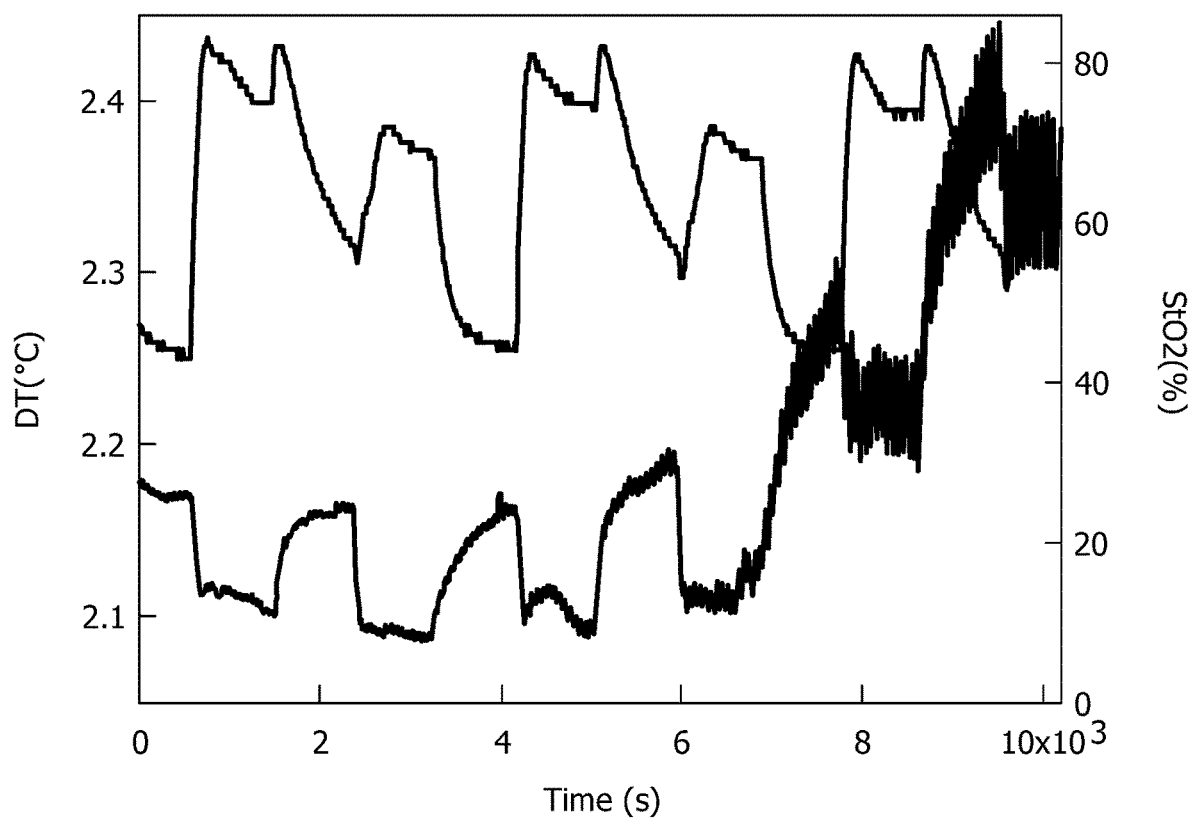
FIG. 21A is a graph summarizing readouts of a thermal flow probe (green, Thermal flow probe) and a ViOptix T.Ox probe (black, ViOptix) implanted within a porcine rectus abdominus myocutaneous flap as shown in FIG. 24 during several cycles of ischemia (I), reperfusion (R), congestion (C), and decongestion (D), in which the thermal flow probe readouts are uncorrected.

FIG. 21A is a graph summarizing differential temperature measurements obtained using a thermal conductivity probe as described above. In FIG. 21A, differential temperature measurements ($\Delta T$) are compared to $StO_2$ measurements obtained using a ViOptix T.Ox probe during several cycles of ischemia (I), reperfusion (R), congestion (C), and decongestion (D) of a skin flap using methods similar to those described in Example 1 below. The $\Delta T$ signal measured by the thermal conductivity probe demonstrates increases during ischemia and congestion, and decreases during recovery and decongestion, with time courses that are similar in shape but opposite in direction to the corresponding time courses of the $StO_2$ measurements obtained using a ViOptix T.Ox probe. In some aspects, the second flow term may be isolated from Eqn. (4) to estimate flow speed.

Figure 21B:
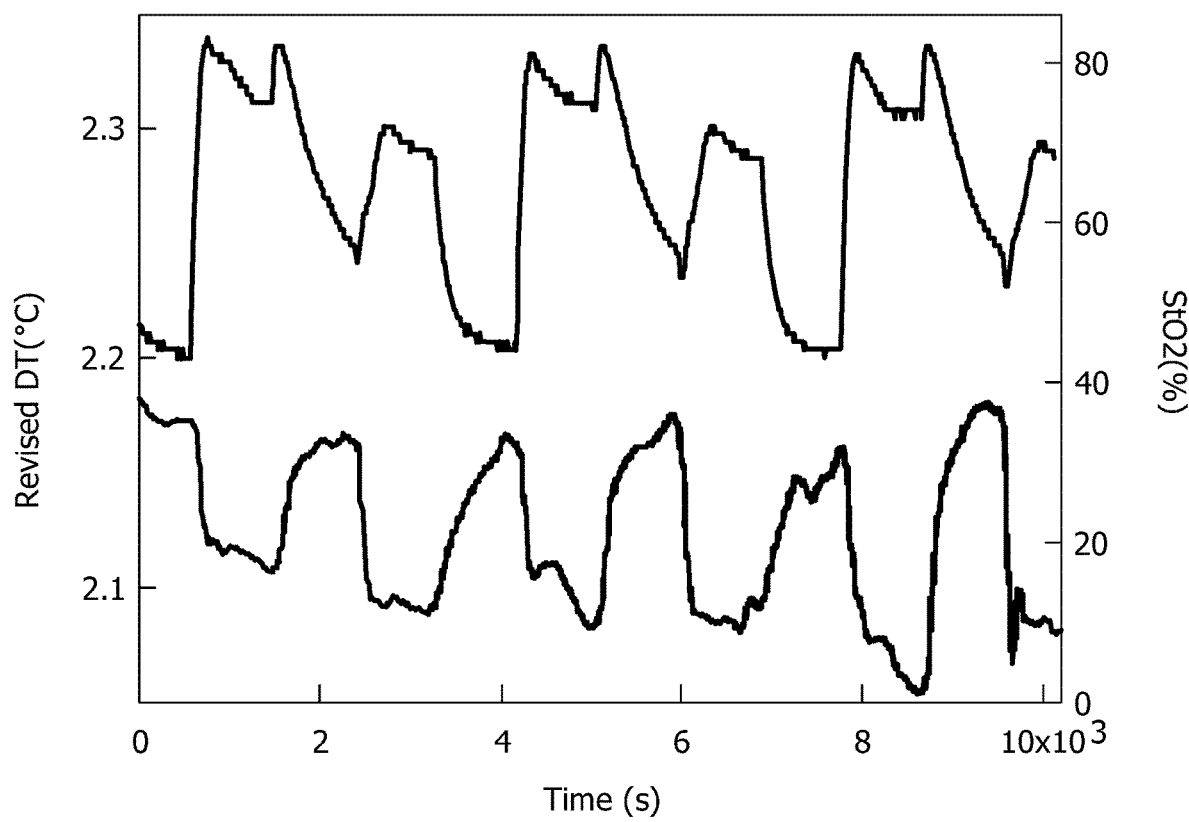
FIG. 21B is a graph summarizing readouts of a thermal flow probe (green, Thermal flow probe) and a ViOptix T.Ox probe (black, ViOptix) implanted within a porcine rectus abdominus myocutaneous flap as shown in FIG. 24 during several cycles of ischemia (I), reperfusion (R), congestion (C), and decongestion (D) after real-time correction of thermal conductivity effects based on AC measurements.

Referring again to FIG. 21A, the $\Delta T$ measurements may subject to signal drift due to variations in the thermal conductivity (k) of the tissue due to drying or other effects. In some aspects, the $\Delta T$ measurements may be corrected using the AC amplitude of the $\Delta T$ signal. Without being limited to any particular theory, changes in the AC amplitude of the $\Delta T$ signal ($\Delta T_{AC}$) are proportional to (1/k). FIG. 21B is a graph summarizing differential temperature measurements obtained using a thermal conductivity probe and corrected using $\Delta T_{AC}$ as described above. As illustrated in FIG. 21B, the $\Delta T_{AC}$ eliminated the signal drift effects shown in FIG. 21A.

Figure 24:
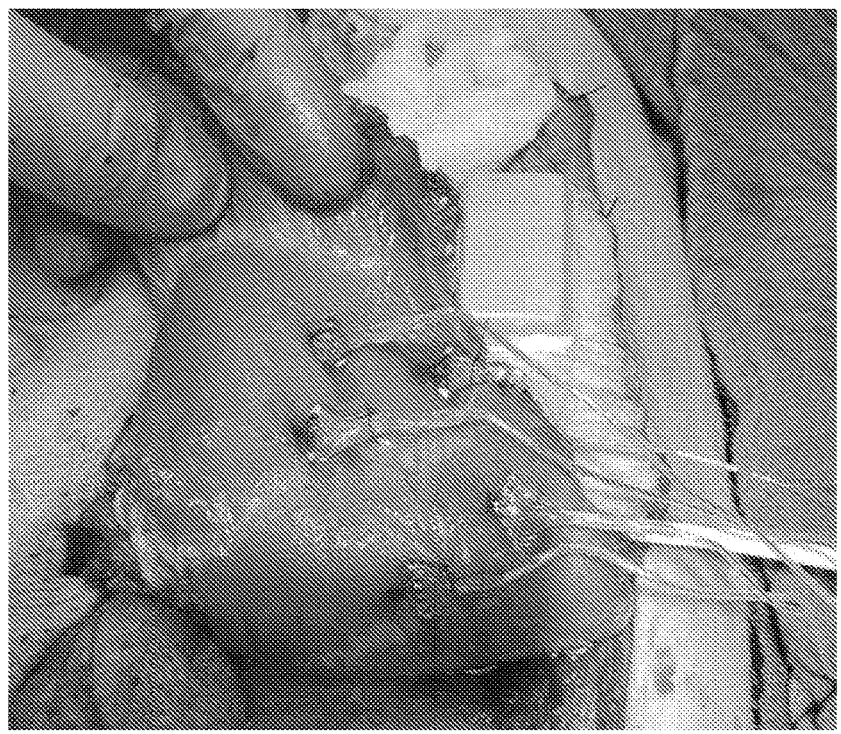
FIG. 24 is an image of implanted resorbable thermal flow probes within a porcine rectus abdominus myocutaneous flap in accordance with one aspect of the disclosure.
Figure 28:
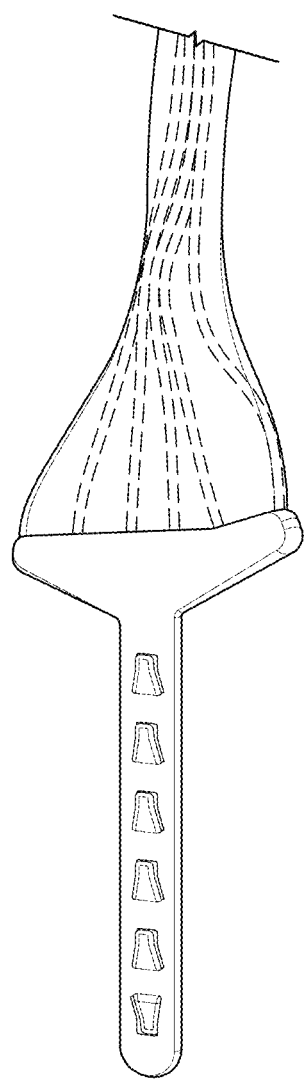
FIG. 28 is an image of an implantable resorbable thermal flow probe provided with barbs in accordance with one aspect of the disclosure.

In various other aspects, the thermal conductivity probe may be provided in the form of an implantable probe. In one aspect, the implantable probe is provided as an insertable form that includes a heater and at least two temperature detectors positioned at different distances from the heater as described above. FIG. 28 is an illustration of an implantable thermal conductivity probe in one aspect. As illustrated in FIG. 28, the probe includes wires to provide power to the heater and at least one temperature sensor from an external power source, and to transmit signals indicative of temperature measurements to an external computing device for analysis and display as described above. In some aspects, the implantable thermal conductivity probe may include a plurality of barbs (see FIG. 28) to secure the probe in place when implanted within a tissue, as illustrated in FIG. 24. In some aspects, at least portions of the implantable thermal conductivity probe include the bioresorbable or biodegradable materials described above.

II. Alternative and Multi-Sensor Probes

In various aspects, the disclosed probes described above may be modified to incorporate electronic subsystems to implement additional sensing capabilities including, but not limited to, alternative perfusion sensing schemes in addition to the SDS and thermal conductivity methods described above, skin hydration sensing, and sensing of parameters related to patient metabolic status including glucose, lactate, pH, and blood gas levels. In some aspects, an SRS probe may further include a heating element and at least two temperature sensors to provide thermal conductivity perfusion sensing in addition to SRS perfusion sensing. In other aspects, a thermal conductivity probe may further include at least two light sources and at least two light detectors to provide SRS perfusion sensing in addition to thermal conductivity perfusion sensing. In some aspects, the wireless probe includes additional electronic subsystems to provide sensing capabilities in addition to the perfusion sensing capability using SDS and thermal conductivity methods as described above.

In some aspects, the wireless probe is provided with additional electronic subsystems for monitoring multiple parameters indicative of tissue perfusion including, but not limited to, temperature, pressure, pH, oxygen saturation, and lactate. In one aspect, the additional electronic subsystem includes a silicon nanomembrane (Si—NM) sensing elements that is insulated via uniform layers of $SiO_2$ (~100 nm) and bonded onto a bilayer of D-PI (diluted polyimide (poly(pyromellitic dianhydride-co-4,4'-oxydianiline)), ~200 nm)/PMMA (poly(methyl methacrylate), ~300 nm), transferred to a PLGA film (~30 μm) containing laser-cut Mg and Mo traces and antennae. The additional electronic subsystem in this aspect to forms passive micro-scale sensors capable of communicating biophysical measurements to external receivers using any communication protocol including, but not limited to, a Bluetooth protocol or a near field communication (NFC) protocol. In some aspects, the additional electronic subsystem is formed from biodegradable materials as described above to perform over a predetermined duration prior to complete and harmless dissolution into the body of the patient.

In other additional aspects, the perfusion probe is provided with additional electronic subsystems for monitoring skin hydration perfusion of a tissue. In these other additional aspects, the wireless probe detects skin hydration based on measurements of heat flow from a heat source into the skin of the patient. The additional electronic subsystems include a thermal sensing module (TSM) for rapid, noninvasive characterization and depth profiling of the skin. The digitally controlled TSM includes a plurality of collection of precision thermistors and thermal actuators, as well as Wheatstone-bridge circuits that combine the thermistors (TH+, TH−) and a differential amplifier to ensure accurate measurements. The actuators include two resistors (2×340Ω) in series, each with a width of 0.3 mm, a length of 0.6 mm, and a height of 0.25 mm. In these other additional aspects, the controller activates a general-purpose input/output (GPIO) pin to source a periodic current (~4.9 mA for a 17% duty cycle at a period of 1 min) into the resistive heater. Applied current generates a constant thermal power (P=25 mW·mm$^{-2}$) at the top surface of the structure and, by thermal diffusion, delivers heat to the skin below. The amount of heat transported from each thermal actuator to the thermistors positioned about (~500 μm away from the center of the thermal actuator) depends upon the thermal properties of the patient's skin. Wheatstone-bridge circuits convert the resistance measurements of temperature from the thermistors into corresponding voltages (V+, V−), which vary in response to temperature change induced by the thermal actuator with opposite polarity, thereby providing an enhanced sensitivity compared with the conventional transient plane source (TPS) sensing technology. The additional electronic subsystems may further include an amplifier to further amplify the voltage differences of the thermistors while eliminating the common-mode noise to increase the signal to noise ratio. After transmission of signals encoding the thermistor voltages to a computing device using a Bluetooth protocol or cable as described above, an application operating on the computing device may convert the thermistor voltages into corresponding temperature values that are correlated with skin hydration state.

III. Sensing Systems

In various aspects, sensing systems are disclosed that include a computing device operatively coupled to any of the wireless or cabled probes described above. The computing device may provide any one or more of at least several functions of the sensing system including, but not limited to receiving and logging signals measured by the electrical subsystems of the probe, transforming the signals into measures of perfusion, skin hydration, or any of the other parameters described above. The computing device may further display the parameters to a practitioner in real-time, and may further produce an alarm if the measured parameter indicates a situation requiring additional treatment by the practitioner. By way of non-limiting example, a computing device operatively coupled to a perfusion sensor may produce an alarm if a parameter indicative of perfusion falls out of a range associated with healthy tissue perfusion.

In various aspects, the computing device of the system may be any suitable computing device without limitation including, but not limited to, a computer, a server, a cellular phone, a tablet, and any other suitable computing device.

Figure 29:
FIG. 29 is an image of an output of a wireless skin hydration probe on a cellular telephone screen in accordance with one aspect of the disclosure.
Figure 30:
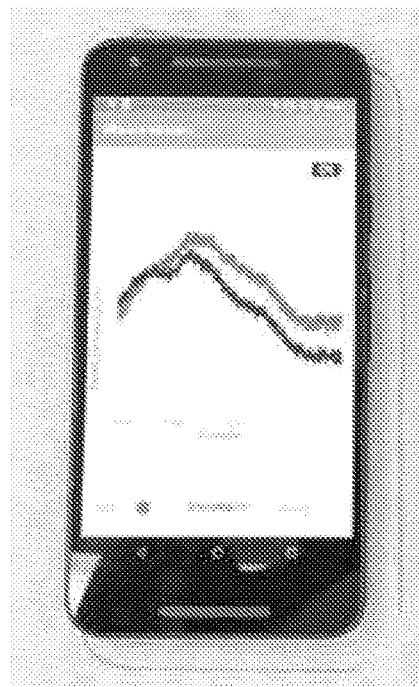
FIG. 30 is a display of an output of a thermal flow probe on a cellular phone screen in accordance with one aspect of the disclosure.
Figure 31:
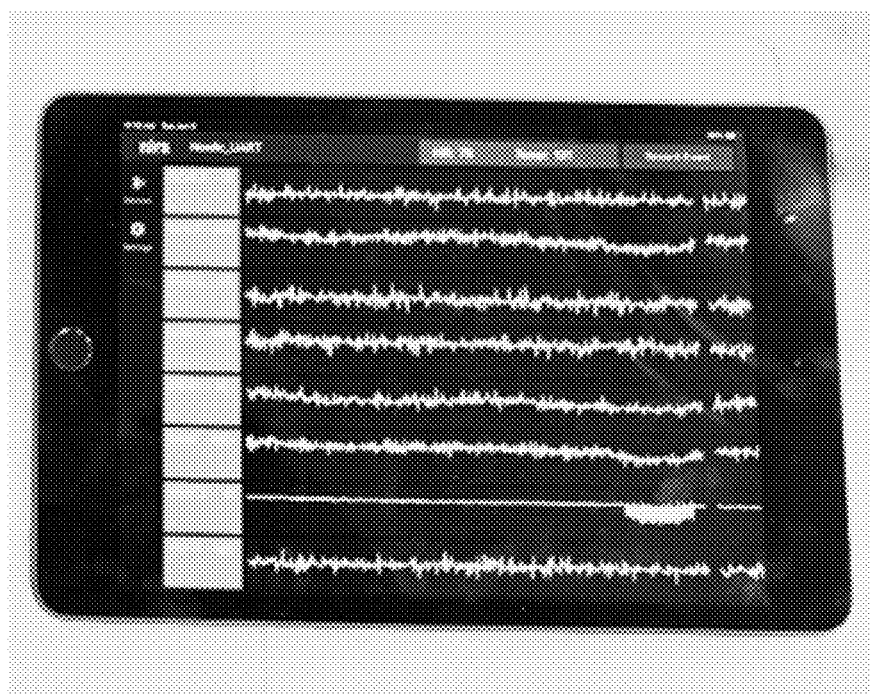
FIG. 31 is a display of an output of a NIRS probe on a screen of a tablet device in accordance with one aspect of the disclosure.

By way of non-limiting examples, FIG. 29 is an image of a display on a cellular phone of the readings from a skin hydration probe, FIG. 30 is a display on a cellular telephone of the readings from a thermal convection probe, and FIG. 31 is a display on a tablet of the readings from an NIRS SRS probe.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

The methods and algorithms of the disclosure may be enclosed in a controller or processor. Furthermore, methods and algorithms of the present disclosure, can be embodied as a computer-implemented method or methods for performing such computer-implemented method or methods, and can also be embodied in the form of a tangible or non-transitory computer-readable storage medium containing a computer program or other machine-readable instructions (herein "computer program"), wherein when the computer program is loaded into a computer or other processor (herein "computer") and/or is executed by the computer, the computer becomes an apparatus for practicing the method or methods. Storage media (also referred to as memory) for containing such computer program include, for example, floppy disks and diskettes, compact disk (CD)-ROMs (whether or not writeable), DVD digital disks, RAM and ROM memories, computer hard drives and back-up drives, external hard drives, "thumb" drives, and any other storage medium readable by a computer. The method or methods can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the method or methods. The method or methods may be implemented on a general-purpose microprocessor or on a digital processor specifically configured to practice the process or processes. When a general-purpose microprocessor is employed, the computer program code configures the circuitry of the microprocessor to create specific logic circuit arrangements. Storage medium readable by a computer includes medium being readable by a computer per se or by another machine that reads the computer instructions for providing those instructions to a computer for controlling its operation. Such machines may include, for example, machines for reading the storage media mentioned above.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

IV. The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Any publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

EXAMPLES

The following examples illustrate various aspects of the disclosure.

Example 1: Wireless Perfusion Monitoring of Porcine Myocutaneous Flaps

To demonstrate the effectiveness of a wireless probe for monitoring perfusion as described herein, the following experiments were conducted.

Anesthesia was induced in pigs with telazol, ketamine, and xylazine followed by maintenance with inhaled isoflurane. After completion of all experimentation, the pigs were euthanized with pentobarbital.

Figure 12A:
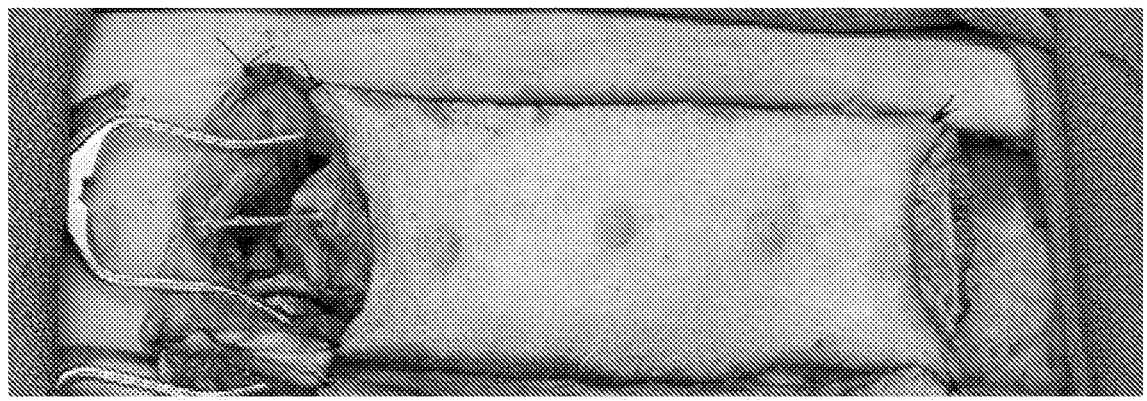
FIG. 12A is an image of a left porcine rectus abdominus myocutaneous flap (in the perfused state) based upon the deep superior epigastric vessels and the superficial superior epigastric vein.
Figure 12B:
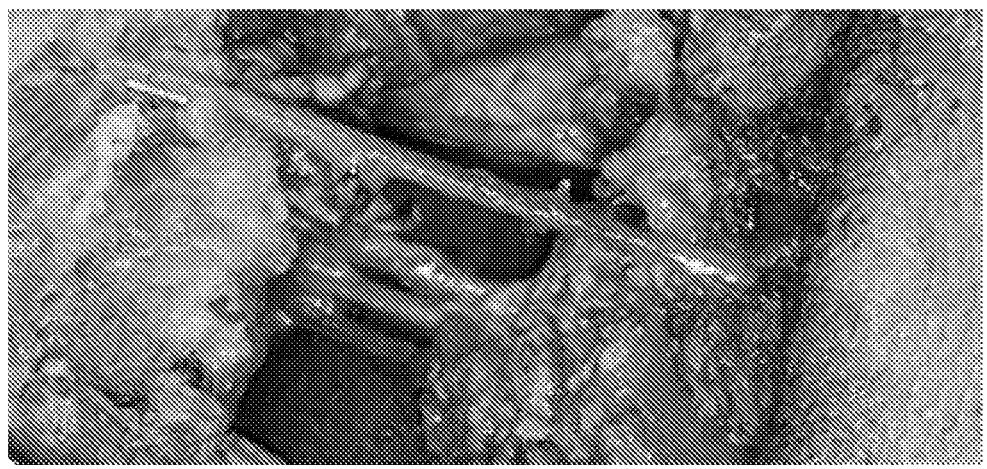
FIG. 12B is a close-up view of the flap pedicle vessels shown in FIG. 12A.
Figure 17A:
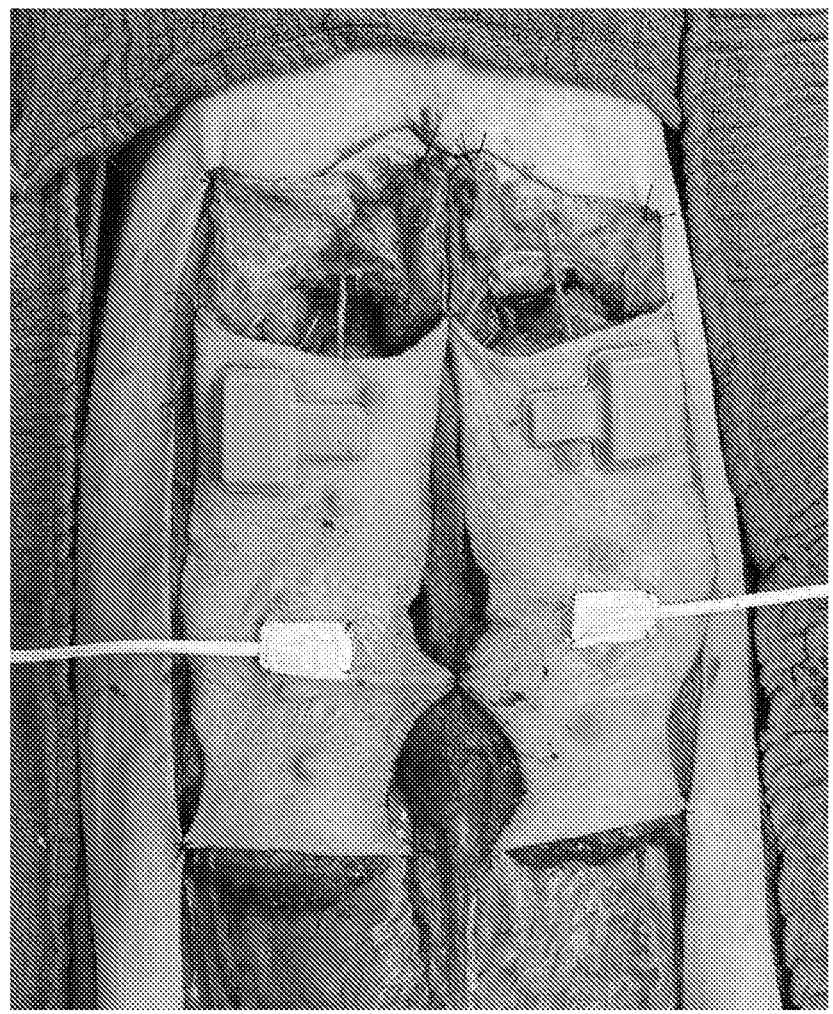
FIG. 17A is an image of bilateral porcine rectus abdominus myocutaneous flaps based upon the deep superior epigastric vessels and superficial superior epigastric veins, with both wireless NIRS and ViOptix T.Ox probes attached in accordance with one aspect of the disclosure.
Figure 17B:
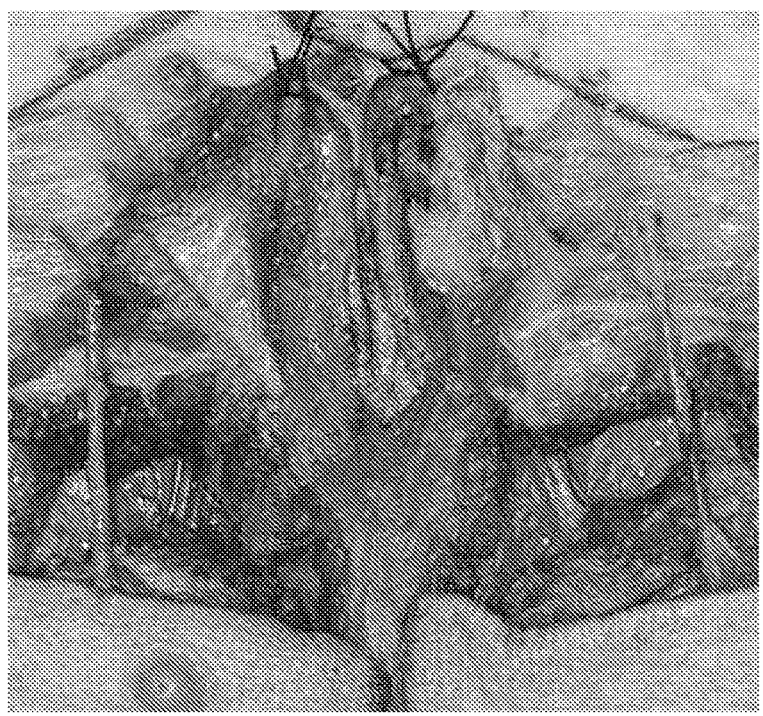
FIG. 17B is a close-up image of the bilateral flaps of FIG. 17A based upon the deep superior epigastric vessels and superficial superior epigastric veins.

In a first pig, a left pedicled rectus abdominus myocutaneous flap was raised based upon the deep superior epigastric artery and veins in addition to the superficial superior epigastric vein, as illustrated in FIGS. 12A and 12B. In a second pig, similar bilateral pedicled rectus abdominus myocutaneous flaps were raised, as illustrated in FIGS. 17A and 17B. In both cases, the flap harvest procedures were adapted from Bodin et al. 2015, the contents of which are incorporated by reference in their entirety. After elevation, flap viability was confirmed by visualization of bright red bleeding at the entire periphery.

Figure 13A:
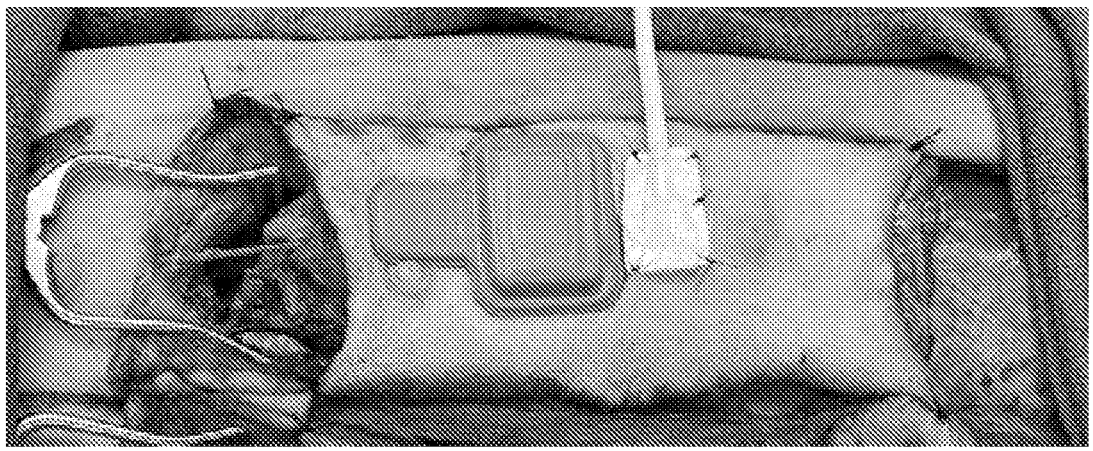
FIG. 13A is an image of the flap of FIG. 12A with both wireless NIRS and ViOptix T.Ox probes attached in accordance with one aspect of the disclosure, in which the flap is rendered ischemic by the addition of an arterial clamp.
Figure 18A:
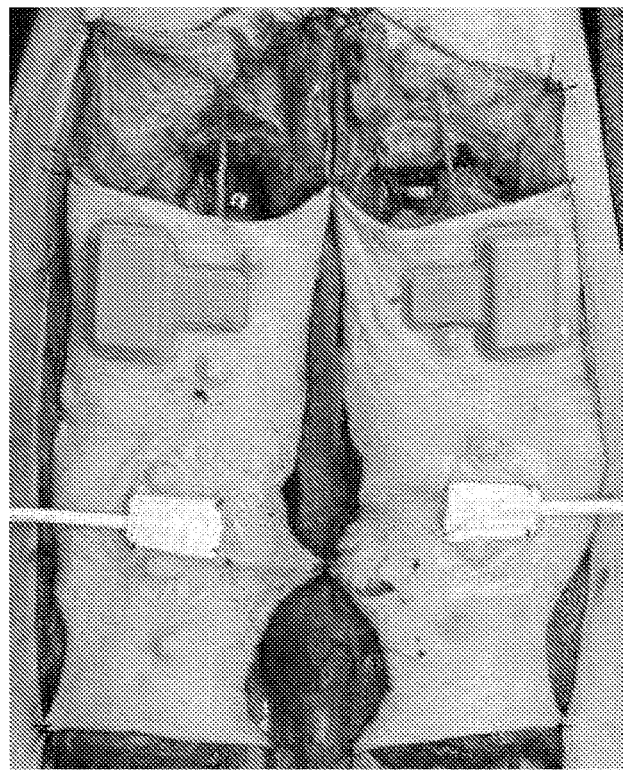
FIG. 18A is an image of the bilateral flaps of FIG. 17A, in which the flaps are rendered ischemic by the addition of arterial clamps.

Wireless NIRS probes similar to the probe illustrated in FIGS. 3A, 3B, 3C, and 3D and described herein were adhered to the central portion of each flap. For comparison, commercially available wired NIR spectroscopy probes (T.Ox probe, ViOptix Inc., Fremont, CA) were implanted adjacent to the wireless NIRS probes, as illustrated in FIGS. 13A and 18A. Each T.Ox probe was attached to an external monitor via a fiber optic cable, and a Bluetooth connection was established between each wireless NIRS device and a smartphone running a monitoring application. Each flap was monitored continuously throughout the experiment using each wireless NIRS probe and each T.OX probe in parallel.

Figure 13B:
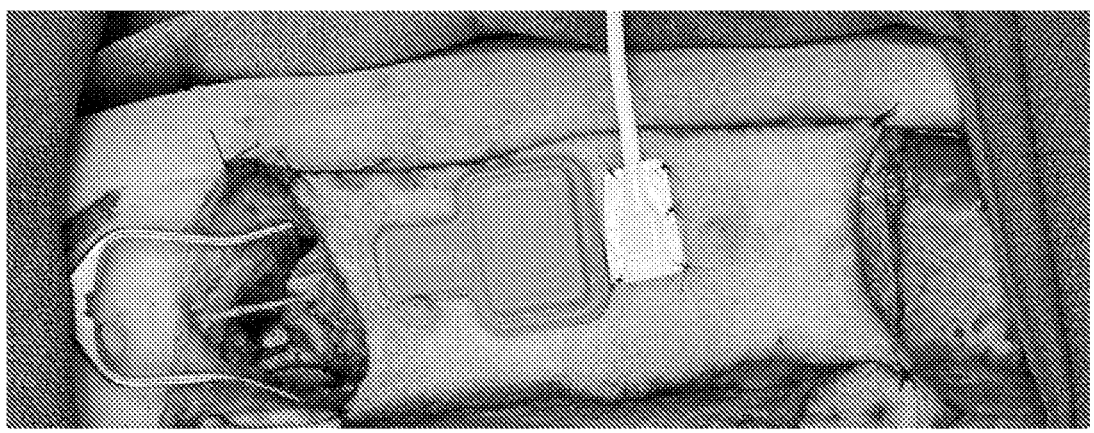
FIG. 13B is an image of the ischemic flap and attached probes of FIG. 13A after release of an arterial clamp and subsequent recovery
Figure 13C:
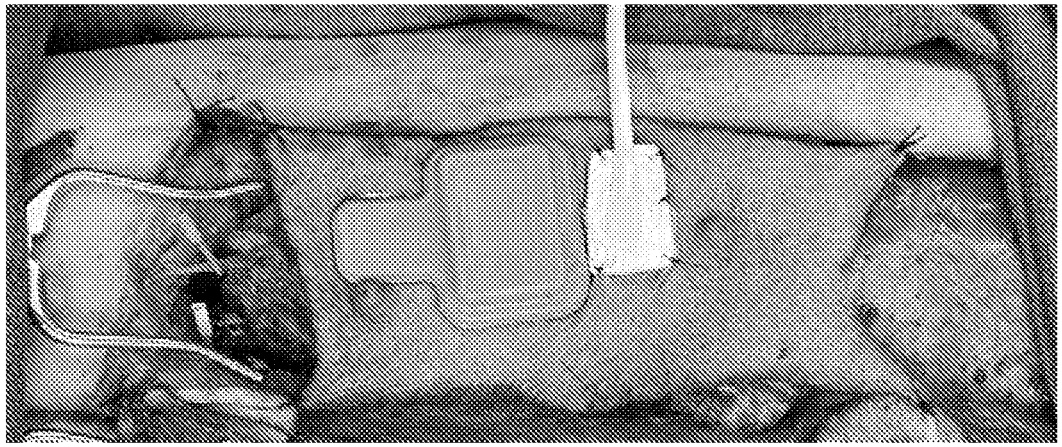
FIG. 13C is an image of the flap and probes of FIG. 13A, in which the flap is rendered congested by the addition of venous clamps.
Figure 13D:
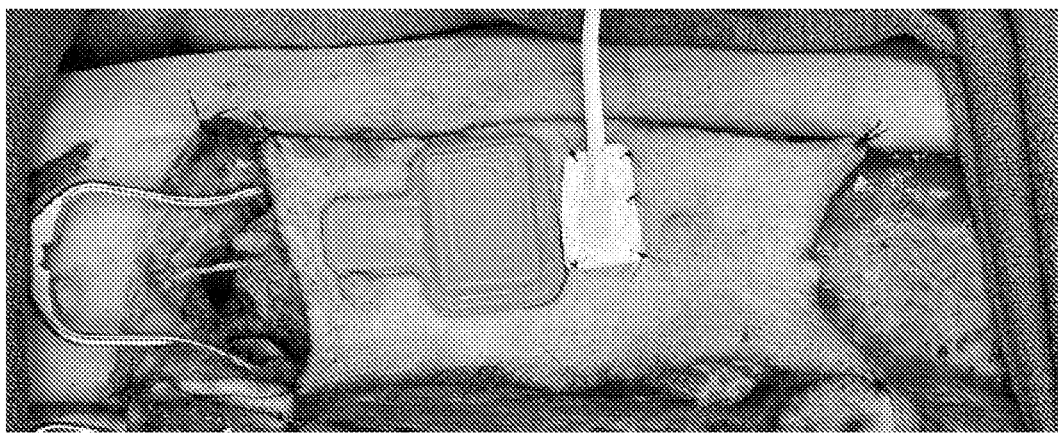
FIG. 13D is an image of the congested flap and attached probes of FIG. 13C after release of the venous clamps and subsequent recovery.
Figure 18B:
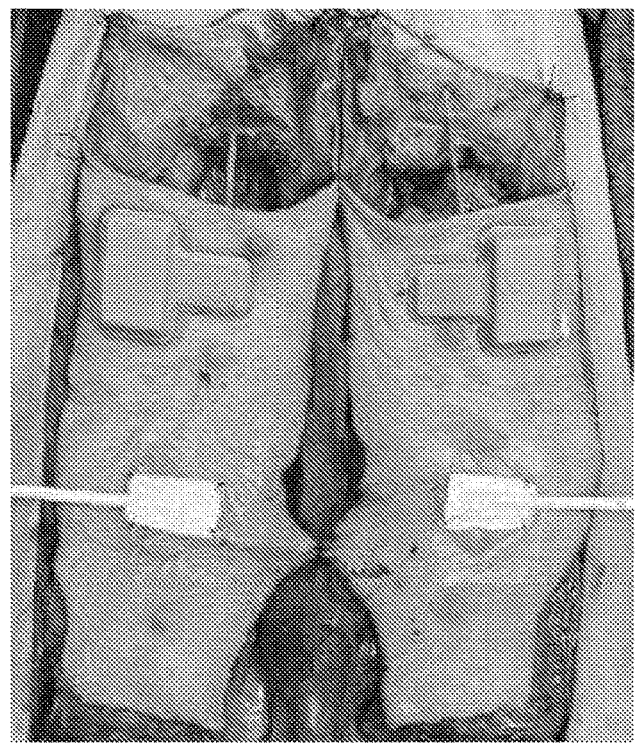
FIG. 18B is an image of the ischemic bilateral flaps of FIG. 18A, after release of the arterial clamps and subsequent recovery
Figure 18C:
FIG. 18C is an image of the bilateral flaps of FIG. 17A, in which the flaps are rendered congested by the addition of venous clamps.
Figure 18D:
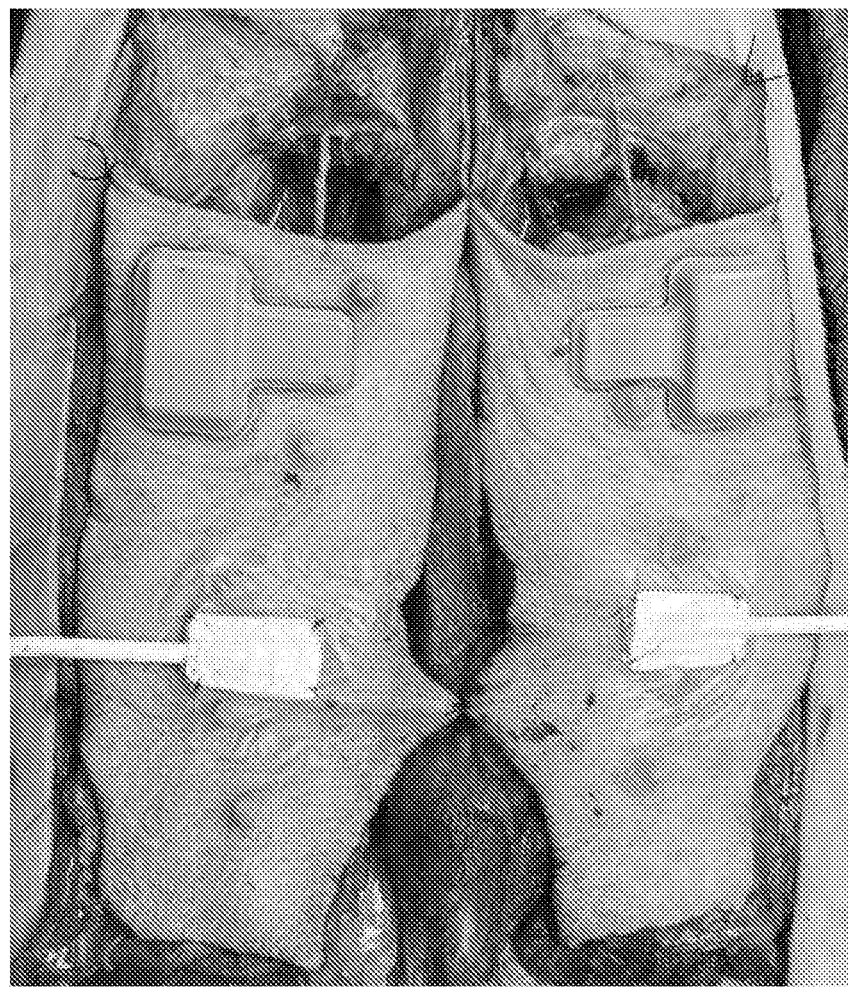
FIG. 18D is an image of the congested bilateral flaps of FIG. 18C, after release of the venous clamps and subsequent recovery.

After achieving a stable baseline reading for each device for 10 minutes, an Acland clamp was applied to each deep superior epigastric artery to induce complete ischemia, as illustrated in FIG. 13A (single flap) and FIG. 18A (bilateral flaps). Ischemia was maintained for 10 minutes and 15 minutes for the single and bilateral flaps, respectively, followed by the release of the Acland clamps, as illustrated in FIG. 13B (single flap) and FIG. 18B (bilateral flaps). The Acland clamps remained released for 15 minutes to allow for flap recovery and re-establishment of a stable baseline reading for all devices. Acland clamps were then applied to each deep and superficial superior epigastric vein to induce venous congestion as illustrated in FIG. 13C (single flap) and FIG. 18C (bilateral flaps). Congestion was maintained for 10 minutes and 15 minutes for the single and bilateral flaps, respectively, followed by the release of the Acland clamp, as illustrated in FIG. 13D (single flap) and FIG. 18D (bilateral flaps). The Acland clamps remained released for 15 minutes to allow for flap recovery and re-establishment of a stable baseline reading for all devices. The cycle of applying and releasing Acland clamps to induce ischemia, recovery, congestion, and recovery was repeated two additional times using the same flaps, yielding nine separate instances of ischemia/recovery and congestion/recovery.

Figure 15:
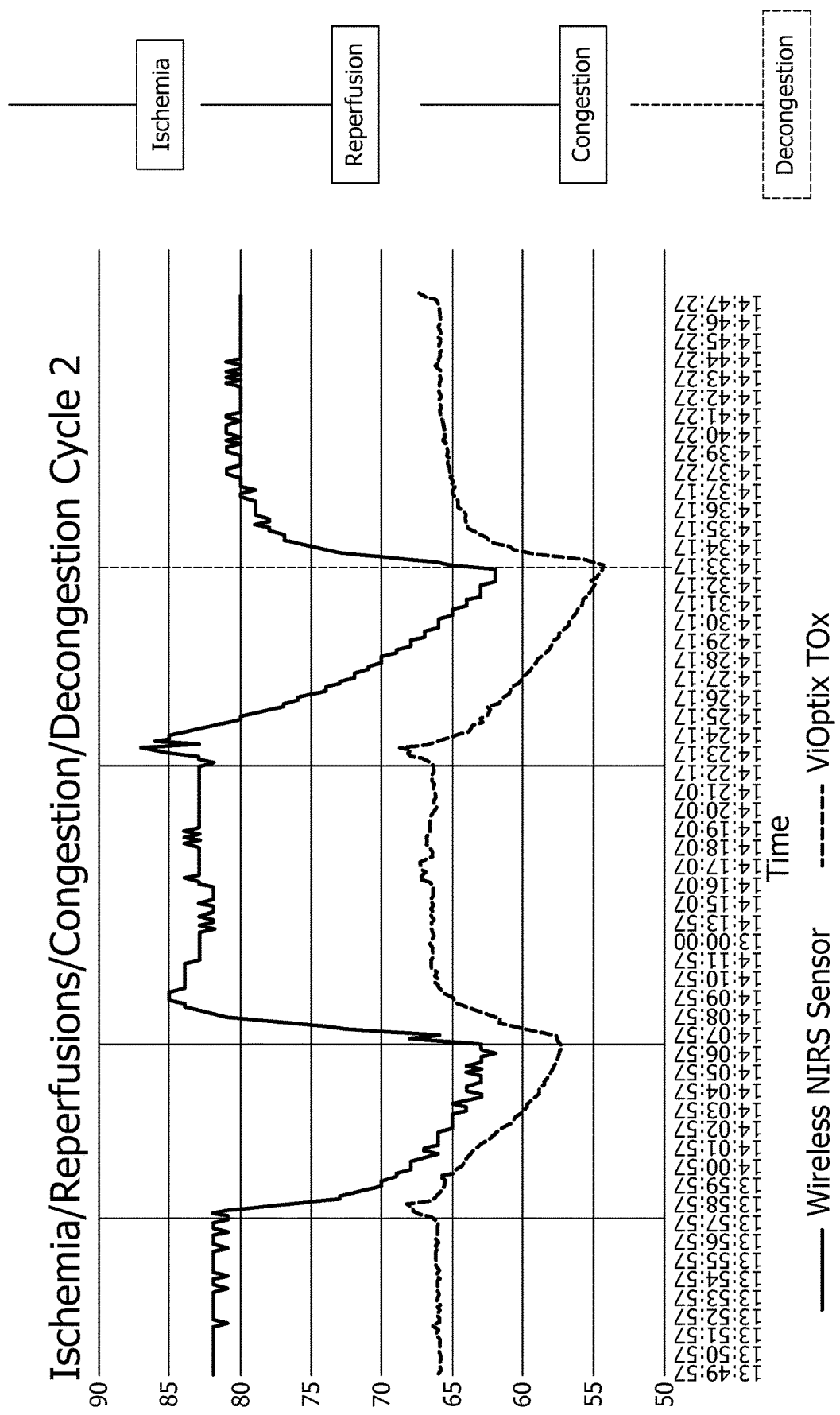
FIG. 15 is a graph summarizing readouts of a wireless NIRS probe and a ViOptix T.Ox probe attached to a flap as shown in FIG. 13A during a second ischemia/reperfusion/congestion/decongestion cycle depicted in FIG. 13A (ischemia), FIG. 13B (reperfusion), FIG. 13C (congestion), and FIG. 13D (decongestion).
Figure 19:
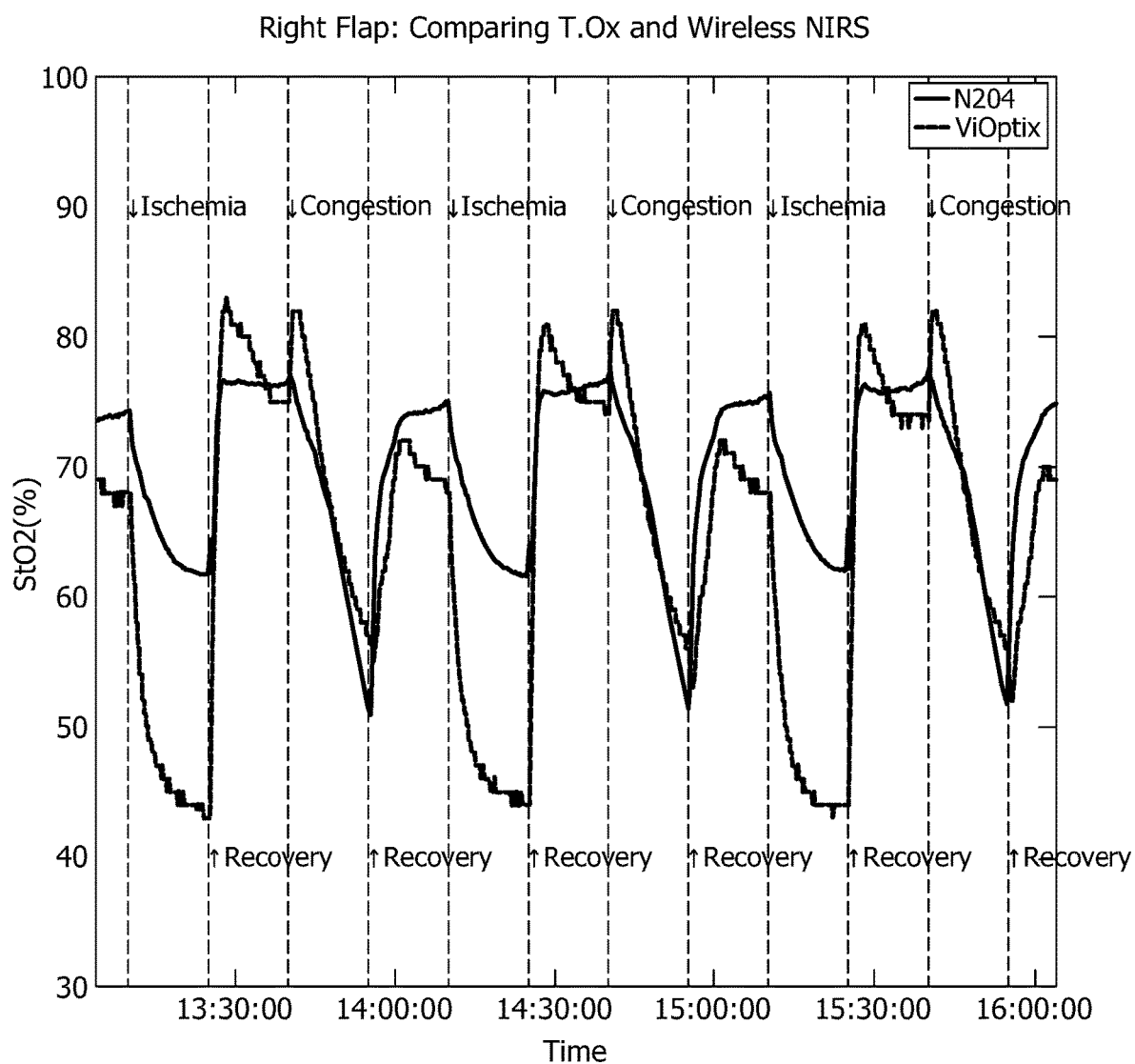
FIG. 19 is a graph summarizing readouts of a wireless NIRS probe (black, N2O4) and a ViOptix T.Ox probe (yellow, ViOptix) attached to the right flap as shown in FIG. 17A during several cycles of ischemia/reperfusion/congestion/decongestion as depicted in FIG. 18A (ischemia), FIG. 18B (reperfusion), FIG. 18C (congestion), and FIG. 18D (decongestion).
Figure 20:
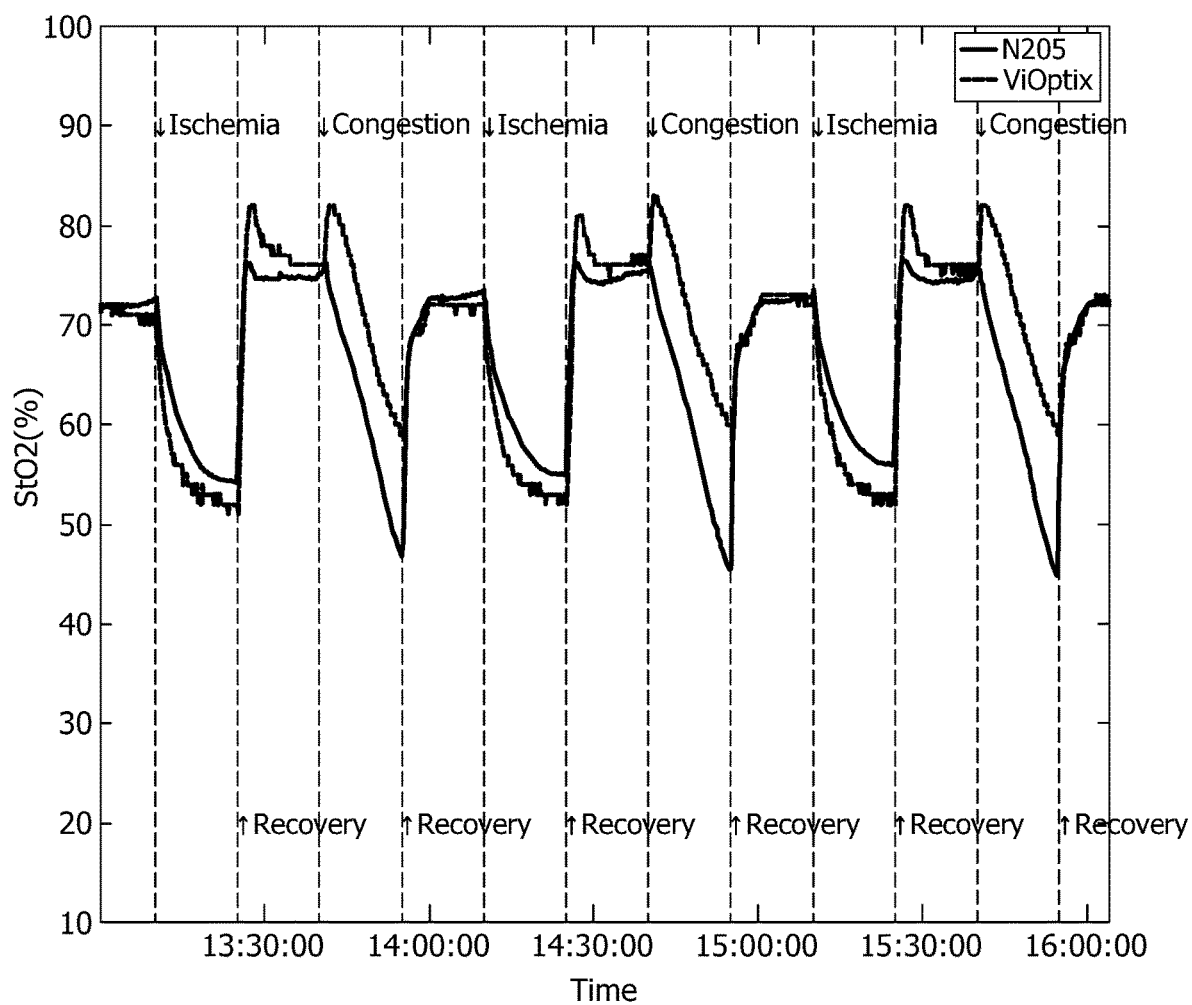
FIG. 20 is a graph summarizing readouts of a wireless NIRS probe (black, N2O5) and a ViOptix T.Ox probe (yellow, ViOptix) attached to the left flap as shown in FIG. 17A during several cycles of ischemia/reperfusion/congestion/decongestion as described in FIG. 19.

Ischemic and congested conditions were successfully achieved and recovered using the protocol above, as confirmed by the expected changes in flap color observed in FIGS. 13A, 13B, 13C, and 13D (single flap), and FIGS. 18A, 18B, 18C, and 18D (bilateral flaps). Continuous monitoring of tissue oxygenation index ($StO_2$) was accomplished by both the wireless NIRS probe and the T.Ox probe throughout all cycles of ischemia and congestion on the single flap preparation (FIGS. 14, 15, and 16) and on each flap of the bilateral flap preparation (FIGS. 19 and 20). No instances of wireless (novel device) or wired (T. Ox) connection loss were encountered during any of the experiments described above.

Referring again to FIGS. 14, 15, 16, 19, and 20, the wireless NIRS probe and T.Ox device produced very similar $StO_2$ tracings throughout the ischemia, congestion, and recovery events, with obvious changes occurring upon arterial clamping, arterial release, venous clamping, and venous release. Small inter-device variations in absolute $StO_2$ value readings and magnitudes of change were observed. However, the patterns within each tracing were consistent with one another and yielded similar diagnostic information.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

Example 2: In Vivo Demonstration in a Porcine Kidney Model

Demonstrations in a porcine kidney model illustrate potential applicability in monitoring reconstruction and regrowth of organ transplants.

As in the muscle flap model, in these experiments the kidney undergoes 15 min cycles of baseline, ischemia with clamped artery, recovery after unclamping artery, congestion with clamped veins, and recovery phases.

Figure 35A:
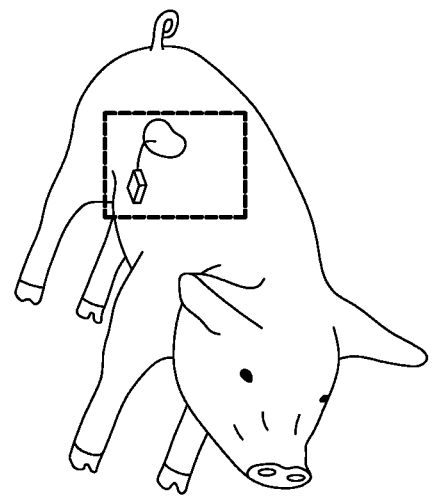
FIG. 35A is an illustration of a raised porcine kidney with an implanted sensor module.
Figure 35B:
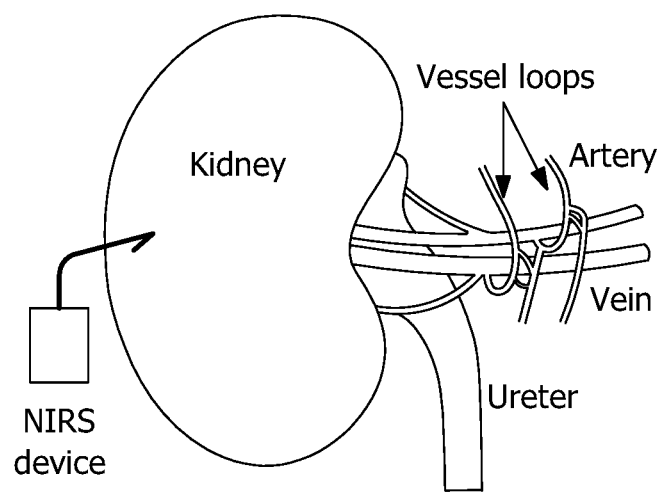
FIG. 35B is another illustration of a raised porcine kidney with an implanted sensor module and the artery and vein for blood exchange.
Figure 35C:
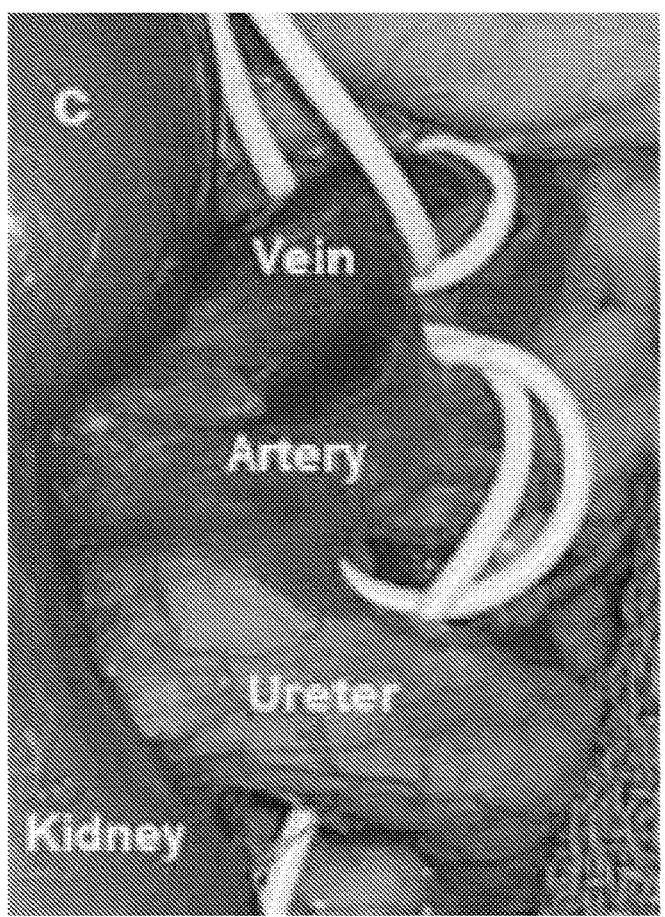
FIG. 35C is a photograph of a raised porcine kidney with an implanted sensor module and the artery and vein for blood exchange.
Figure 35D:
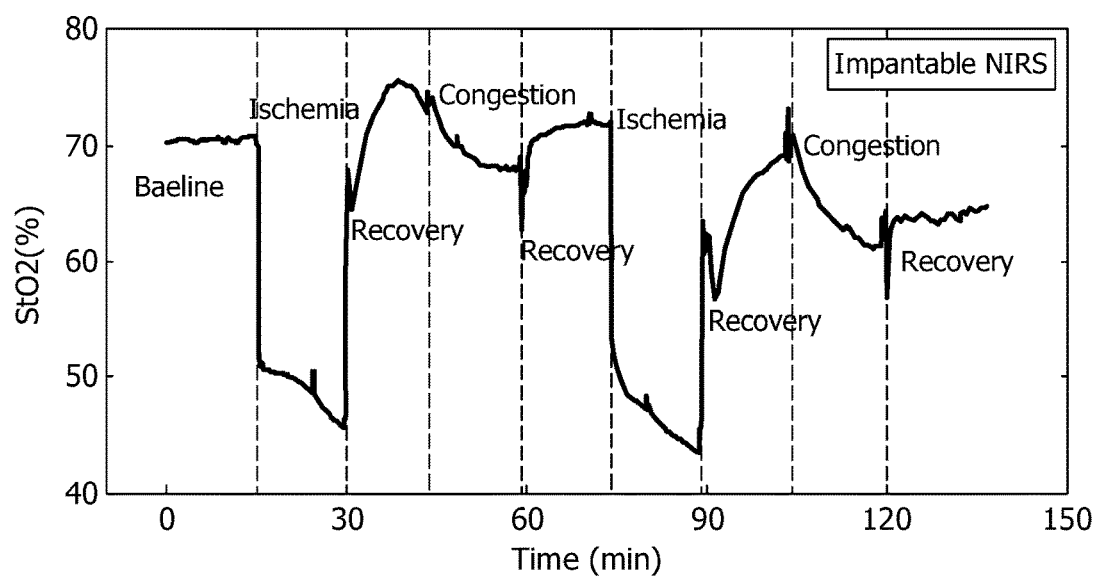
FIG. 35D is a graph of the results of local tissue oxygenation measured in kidney with the probe during two cycles of ischemia and congestion for the setup shown in FIGS. 35A-C.
Figure 36A:
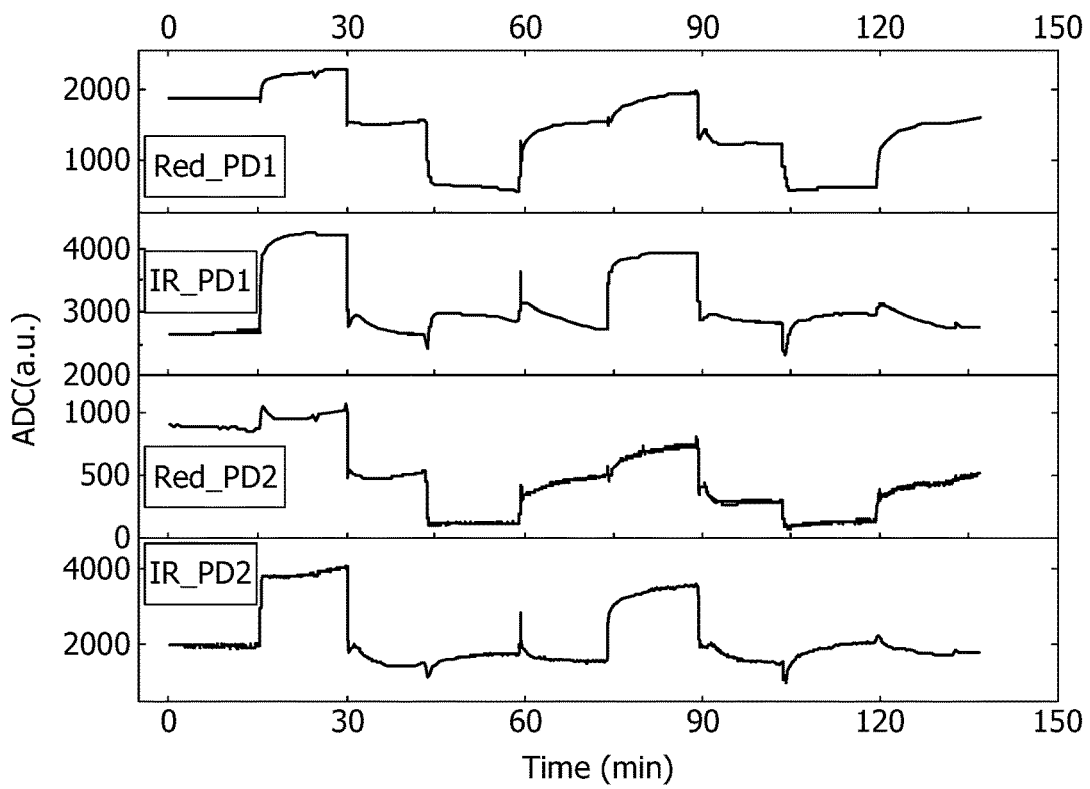
FIG. 36A is representative raw data for the results in FIG. 35D.
Figure 36B:
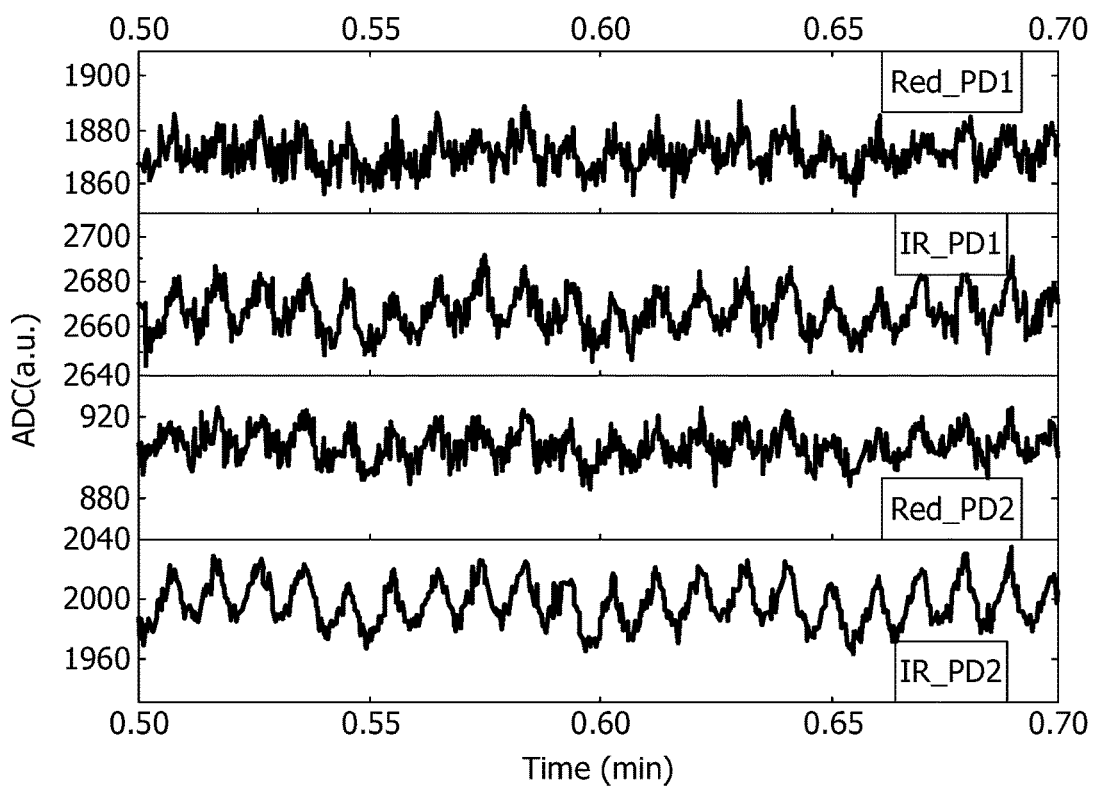
FIG. 36B is more representative raw data for the results in FIG. 35D.
Figure 37:
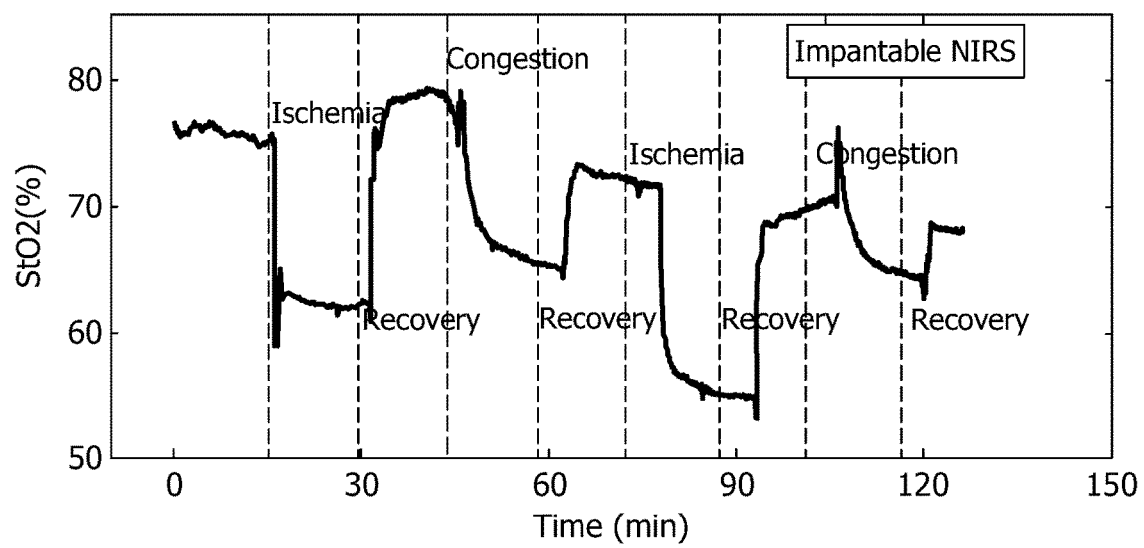
FIG. 37 is a graph of additional results from another independent device on the same animal as in FIG. 35D
Figure 38:
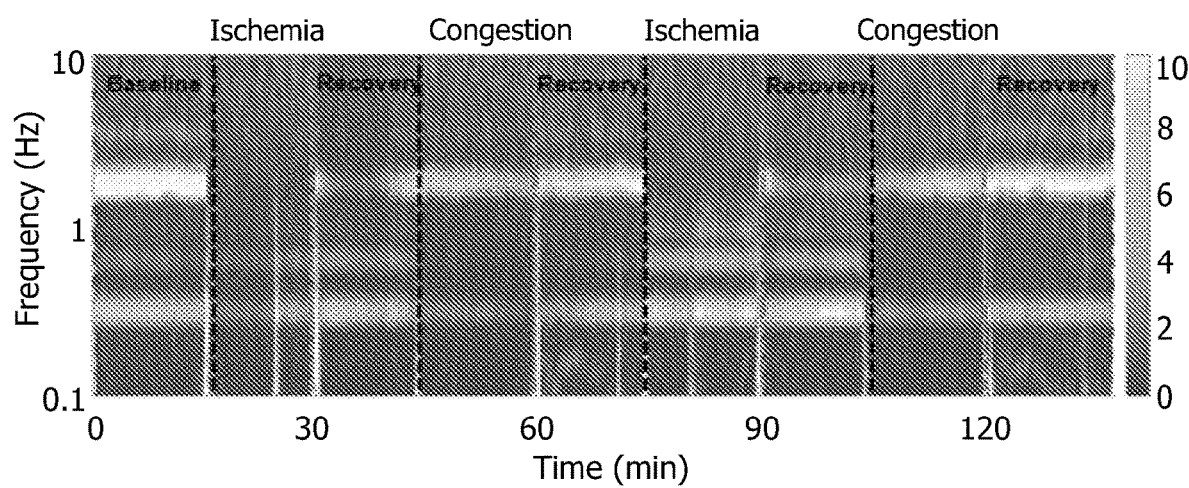
FIG. 38 is a Fourier transforms of the raw data from FIGS. 36A and 36B.
Figure 39:
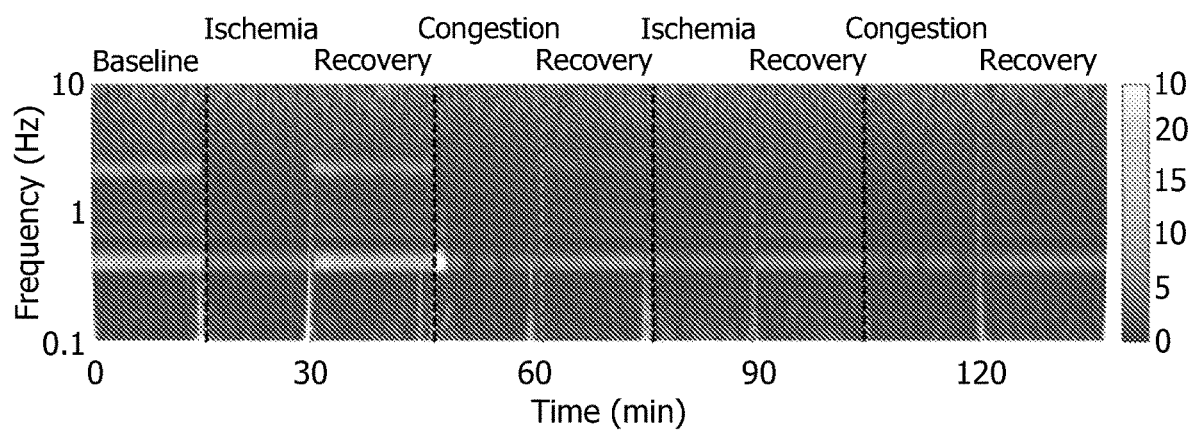
FIG. 39 is a Fourier transform of raw data collected to produce the results shown in FIG. 37.

FIGS. 35A-C shows schematic illustrations of a raised kidney with an implanted sensor module and the artery and vein for blood exchange. The results of local tissue oxygenation measured in kidney with the probe during two cycles of ischemia and congestion appear in FIG. 35D, with representative raw data in FIGS. 36A and 36B. Additional measurements from another independent device on the same animal are shown in FIG. 37 to illustrate the reproducibility of the results, and the correspondence between data collected from two independent probes (normalized cross-correlation at zero lag >0.999). The data presented in FIG. 36B highlight the patterns of pulsation that result from blood flow inside the kidney. Fourier transforms of the raw data (FIGS. 38 and 39) show changes in heartbeat signal (at 1.7-2.5 Hz) and respiration signal (at ~0.3 Hz) during the occlusion of blood vessels to flap and kidney. The strength of the pulsatile component of the signal decreases during ischemia/congestion, as a simple, binary indication of blood flow.

What is claimed is:

1. A wearable probe for monitoring blood flow in biological tissue comprising:
 a sensor module configured to be positioned proximate the tissue to be monitored, the sensor module comprising:
  at least one transmission source configured to transmit signals into the tissue at a source position; and
  at least two detectors configured to detect a result of the signals transmitted by the at least one transmission source, the at least two detectors including a first detector positioned at a first separation distance from the source position and a second detector positioned at a second separation distance from the source position, wherein the at least one transmission source comprises at least one light source, the at least two detectors comprise at least two photodetectors, the signals transmitted into the tissue comprise light waves, the results of the signals comprise light waves reflected by the tissue, and the at least two photodetectors comprises a positive-intrinsic-negative (PIN) diode; and
 a control module electrically connected to the sensor module, the control module comprising:
  a controller, the controller including:
   a processor;
   a memory including instructions executable by the processor; and
   a communications interface, wherein the instruction, when executed by the processor, cause the processor to control the sensor module to transmit signals into the tissue and detect results of the signals with the at least two detectors, receive the detected results, store the detected results in the memory, and transmit the detected results to a remote device using the communications interface; and
  a battery operable to power the controller and the sensor module.

2. The probe of claim 1, wherein the at least one light source comprises a light-emitting diode (LED).

3. A wearable probe for monitoring blood flow in biological tissue comprising:
 a sensor module configured to be positioned proximate the tissue to be monitored, the sensor module comprising:
  at least one transmission source configured to transmit signals into the tissue at a source position; and
  at least two detectors configured to detect a result of the signals transmitted by the at least one transmission source, the at least two detectors including a first detector positioned at a first separation distance from the source position and a second detector positioned at a second separation distance from the source position, wherein the at least one transmission source comprises at least one light source, the at least two detectors comprise at least two photodetectors, the signals transmitted into the tissue comprise light waves, the results of the signals comprise light waves reflected by the tissue, and the at least one light source is configured to produce light at a first wavelength and a second wavelength different than the first wavelength; and
 a control module electrically connected to the sensor module, the control module comprising:
  a controller, the controller including:
   a processor;
   a memory including instructions executable by the processor; and
   a communications interface, wherein the instruction, when executed by the processor, cause the processor to control the sensor module to transmit signals into the tissue and detect results of the signals with the at least two detectors, receive the detected results, store the detected results in the memory, and transmit the detected results to a remote device using the communications interface; and
  a battery operable to power the controller and the sensor module.

4. The probe of claim 3, wherein the first wavelength is about 860 nm and the second wavelength is about 740 nm.

5. The probe of claim 3, wherein the controller is further configured to operate the at least one light source to produce light at the first wavelength and the second wavelength in an alternating pattern.

6. The probe of claim 5, wherein the alternating pattern comprises alternating between wavelengths at a frequency of about 25 Hz and with a duty cycle of about 1%.

7. A wearable probe for monitoring blood flow in biological tissue comprising:
 a sensor module configured to be positioned proximate the tissue to be monitored, the sensor module comprising:
  at least one transmission source configured to transmit signals into the tissue at a source position;
  at least two detectors configured to detect a result of the signals transmitted by the at least one transmission source, the at least two detectors including a first detector positioned at a first separation distance from the source position and a second detector positioned at a second separation distance from the source position; and
  a flexible printed circuit board (fPCB) platform, wherein the at least one transmission source and the at least two detectors are electrically mounted on the fPCB platform; and
 a control module electrically connected to the sensor module, the control module comprising:
  a controller, the controller including:
   a processor;
   a memory including instructions executable by the processor; and
   a communications interface, wherein the instruction, when executed by the processor, cause the processor to control the sensor module to transmit signals into the tissue and detect results of the signals with the at least two detectors, receive the detected results, store the detected results in the memory, and transmit the detected results to a remote device using the communications interface; and
  a battery operable to power the controller and the sensor module.

8. The probe of claim 7, wherein the at least one transmission source comprises at least one heating element, the at least two detectors comprise at least two thermal sensors, the signals transmitted into the tissue comprise heat produced by the heating element, and the results of the signals comprise temperatures of the tissue.

9. The probe of claim 7, wherein the fPCB platform comprises patterned polyimide copper layers affixed on a top surface and a bottom surface of a polyimide middle layer.

10. The probe of claim 9, wherein the fPCB platform comprises a first platform portion and a second platform portion operatively coupled together by flexible conductive interconnects.

11. The probe of claim 10, wherein the at least one transmission source and the at least two detectors are electrically mounted on the first platform portion of the fPCB platform and the controller is mounted on the second platform portion of the fPCB platform.

12. The probe of claim 7, further comprising a flexible waterproof casing enclosing the sensor module, the control module, or both.

13. The probe of claim 12, wherein the flexible waterproof casing further comprises an exposed contact surface configured to conformally contact a surface of the tissue, and at least a portion of the contact surface contains an adhesive layer configured to seal the contact surface to the surface of the tissue.

14. The probe of claim 13, wherein a plurality of windows formed through the contact surface of the flexible waterproof casing to transmit signals from the at least one transmission source into the tissue and to receive results from the tissue into the at least two detectors.

15. The probe of claim 7, wherein the sensor module further comprises an additional detector configured for sensing at least one tissue parameter chosen from hydration, glucose concentration, lactate concentration, pH, and blood gas levels.

16. A wearable probe for monitoring blood flow in biological tissue comprising:
   a sensor module configured to be positioned proximate the tissue to be monitored, the sensor module comprising:
      at least one transmission source configured to transmit signals into the tissue at a source position; and
      at least two detectors configured to detect a result of the signals transmitted by the at least one transmission source, the at least two detectors including a first detector positioned at a first separation distance from the source position and a second detector positioned at a second separation distance from the source position, wherein the sensor module is configured to be implantable in the biological tissue; and
   a control module electrically connected to the sensor module, the control module comprising:
      a controller, the controller including:
         a processor;
         a memory including instructions executable by the processor; and
         a communications interface, wherein the instruction, when executed by the processor, cause the processor to control the sensor module to transmit signals into the tissue and detect results of the signals with the at least two detectors, receive the detected results, store the detected results in the memory, and transmit the detected results to a remote device using the communications interface; and
      a battery operable to power the controller and the sensor module.

17. The probe of claim 16, wherein the sensor module includes a plurality of barbs configured to anchor the sensor module within the biological tissue when the sensor module is implanted in the biological tissue.

18. The probe of claim 17, wherein the plurality of barbs are made of a resorbable material.

* * * * *